United States Patent
Chachad et al.

(10) Patent No.: US 11,816,032 B2
(45) Date of Patent: Nov. 14, 2023

(54) CACHE SIZE CHANGE

(71) Applicant: TEXAS INSTRUMENTS INCORPORATED, Dallas, TX (US)

(72) Inventors: Abhijeet Ashok Chachad, Plano, TX (US); Naveen Bhoria, Plano, TX (US); David Matthew Thompson, Dallas, TX (US); Neelima Muralidharan, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/727,912

(22) Filed: Apr. 25, 2022

(65) Prior Publication Data

US 2022/0253382 A1 Aug. 11, 2022

Related U.S. Application Data

(63) Continuation of application No. 16/882,178, filed on May 22, 2020, now Pat. No. 11,314,644.
(Continued)

(51) Int. Cl.
*G06F 12/0811* (2016.01)
*G06F 12/0815* (2016.01)
(Continued)

(52) U.S. Cl.
CPC ........ *G06F 12/0811* (2013.01); *G06F 9/3004* (2013.01); *G06F 9/30079* (2013.01);
(Continued)

(58) Field of Classification Search
None
See application file for complete search history.

(56) References Cited

U.S. PATENT DOCUMENTS

| 5,926,830 A | 7/1999 | Feiste |
| 5,940,858 A | 8/1999 | Green |

(Continued)

FOREIGN PATENT DOCUMENTS

KR 101681423 11/2016

OTHER PUBLICATIONS

Meaney et al. "IBM z990 Soft Error Detection and Recovery." Sep. 2005. IEEE. IEEE Transactions on Device and Materials Reliability. vol. 5. pp. 419-427.*

(Continued)

*Primary Examiner* — Nathan Sadler
(74) *Attorney, Agent, or Firm* — Brian D. Graham; Frank D. Cimino

(57) ABSTRACT

A method includes determining, by a level one (L1) controller, to change a size of a L1 main cache; servicing, by the L1 controller, pending read requests and pending write requests from a central processing unit (CPU) core; stalling, by the L1 controller, new read requests and new write requests from the CPU core; writing back and invalidating, by the L1 controller, the L1 main cache. The method also includes receiving, by a level two (L2) controller, an indication that the L1 main cache has been invalidated and, in response, flushing a pipeline of the L2 controller; in response to the pipeline being flushed, stalling, by the L2 controller, requests received from any master; reinitializing, by the L2 controller, a shadow L1 main cache. Reinitializing includes clearing previous contents of the shadow L1 main cache and changing the size of the shadow L1 main cache.

20 Claims, 12 Drawing Sheets

Related U.S. Application Data

(60) Provisional application No. 62/852,416, filed on May 24, 2019.

(51) Int. Cl.

| | |
|---|---|
| *G06F 12/0808* | (2016.01) |
| *G06F 12/0895* | (2016.01) |
| *G06F 12/128* | (2016.01) |
| *G06F 12/0817* | (2016.01) |
| *G06F 12/084* | (2016.01) |
| *G06F 9/30* | (2018.01) |
| *G06F 11/30* | (2006.01) |
| *G06F 13/16* | (2006.01) |
| *G06F 9/38* | (2018.01) |
| *G06F 9/46* | (2006.01) |
| *G06F 9/54* | (2006.01) |
| *G06F 12/0831* | (2016.01) |

(52) U.S. Cl.
CPC ............ *G06F 9/3867* (2013.01); *G06F 9/467* (2013.01); *G06F 9/544* (2013.01); *G06F 9/546* (2013.01); *G06F 11/3037* (2013.01); *G06F 12/084* (2013.01); *G06F 12/0808* (2013.01); *G06F 12/0815* (2013.01); *G06F 12/0828* (2013.01); *G06F 12/0831* (2013.01); *G06F 12/0895* (2013.01); *G06F 12/128* (2013.01); *G06F 13/1668* (2013.01); *G06F 2212/1021* (2013.01); *G06F 2212/608* (2013.01)

(56) References Cited

U.S. PATENT DOCUMENTS

| | | | |
|---|---|---|---|
| 8,266,383 B1 | 9/2012 | Minkin et al. | |
| 2002/0129208 A1 | 9/2002 | Barroso et al. | |
| 2005/0080994 A1* | 4/2005 | Cohen ................. | G06F 12/0864 711/170 |
| 2007/0260819 A1* | 11/2007 | Gao ..................... | G06F 12/0888 711/138 |
| 2012/0191914 A1* | 7/2012 | Tran .................... | G06F 11/1064 711/E12.024 |
| 2014/0136793 A1* | 5/2014 | Robertson ........... | G06F 12/0891 711/135 |
| 2014/0195737 A1 | 7/2014 | Lilly et al. | |
| 2014/0365730 A1* | 12/2014 | Tsao .................... | G06F 13/1652 711/129 |
| 2015/0309939 A1* | 10/2015 | Sadoughi-Yarandi ...................... | G06F 12/0895 711/135 |
| 2017/0083444 A1* | 3/2017 | Dev .................... | G06F 12/0871 |
| 2018/0060238 A1 | 3/2018 | Esser et al. | |

OTHER PUBLICATIONS

Sorin et al. A Primer on Memory Consistency and Cache Coherence. 2011. Morgan & Claypool. pp. 99-114.*
International Search Report for PCT/US2020/034471 dated Aug. 20, 2020.

\* cited by examiner

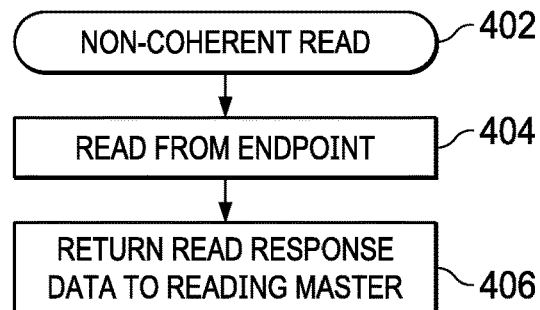
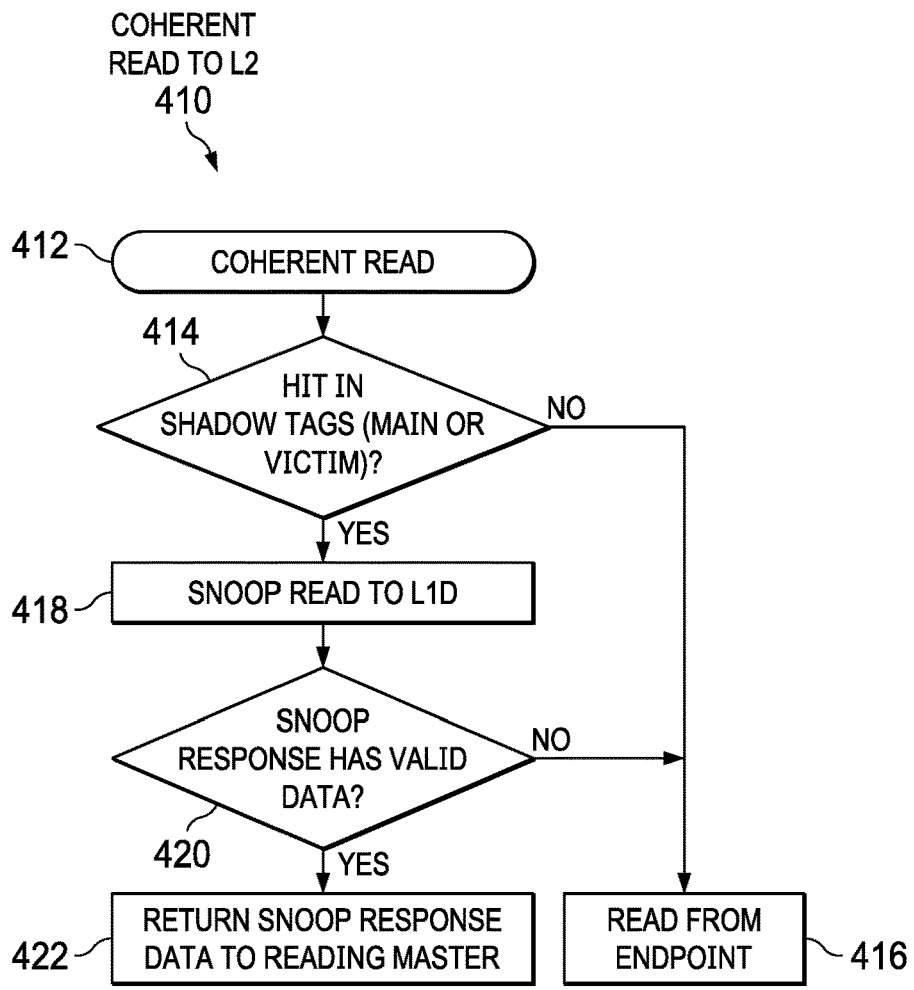
FIG. 4a
FIG. 4b

900

| SIGNAL MNEMONIC | DESCRIPTION | ACTUAL SIGNAL |
|---|---|---|
| victim_address | ADDRESS OF LINE MOVING OUT OF L1 VICTIM CACHE | csband[96:53] |
| victim_secure | SECURE BIT FOR LINE MOVING OUT OF L1 VICTIM CACHE | csband[52] |
| victim_mesi | MESI STATE FOR LINE MOVING OUT OF L1 VICTIM CACHE | csband[51:50] |
| victim_valid | VALID BIT FOR ALL VICTIM* SIGNALS | csband[49] |
| main_address | ADDRESS OF LINE MOVED FROM L1 MAIN CACHE TO L1 VICTIM CACHE | csband[48:5] |
| main_secure | SECURE BIT FOR LINE MOVING FROM L1 MAIN CACHE TO L1 VICTIM CACHE | csband[4] |
| main_mesi | MESI STATE FOR LINE MOVING FROM L1 MAIN CACHE TO L1 VICTIM CACHE | csband[3:2] |
| main_valid | VALID BIT FOR ALL MAIN* SIGNALS | csband[1] |
| alloc | BIT INDICATING WHETHER THE READ ADDRESS LINE WILL BE ALLOCATED INTO L1 MAIN CACHE | csband[0] |

| SIGNAL MNEMONIC | DESCRIPTION |
|---|---|
| t0_req | TAG UPDATE 0 VALID |
| t0_address | TAG UPDATE 0 ADDRESS |
| t0_secure | TAG UPDATE 0 SECURE LEVEL |
| t0_mesi | TAG UPDATE 0 FINAL MESI STATE |
| t1_req | TAG UPDATE 1 VALID |
| t1_address | TAG UPDATE 1 ADDRESS |
| t1_secure | TAG UPDATE 1 SECURE LEVEL |
| t1_mesi | TAG UPDATE 1 FINAL MESI STATE |

FIG. 10

CACHE SIZE CHANGE

CROSS-REFERENCE TO RELATED APPLICATIONS

The present application is a continuation of U.S. patent application Ser. No. 16/882,178, filed May 22, 2020, now U.S. Pat. No. 11,314,644, which claims priority to U.S. Provisional Patent Application No. 62/852,416, filed May 24, 2019, each of which is incorporated herein by reference in its entirety.

BACKGROUND

Some memory systems include a multi-level cache system, in which a hierarchy of memories (e.g., caches) provides varying access speeds to cache data. A first level (L1) cache is closely coupled to a central processing unit (CPU) core and provides the CPU core with relatively fast access to cache data. A second level (L2) cache is also coupled to the CPU core and, in some examples, is larger and thus holds more data than the L1 cache, although the L2 cache provides relatively slower access to cache data than the L1 cache. Additional memory levels of the hierarchy are possible.

SUMMARY

In accordance with at least one example of the disclosure, a method includes determining, by a level one (L1) controller, to change a size of a L1 main cache; servicing, by the L1 controller, pending read requests and pending write requests from a central processing unit (CPU) core; stalling, by the L1 controller, new read requests and new write requests from the CPU core; writing back and invalidating, by the L1 controller, the L1 main cache. The method also includes receiving, by a level two (L2) controller, an indication that the L1 main cache has been invalidated and, in response, flushing a pipeline of the L2 controller; in response to the pipeline being flushed, stalling, by the L2 controller, requests received from any master; reinitializing, by the L2 controller, a shadow L1 main cache. Reinitializing includes clearing previous contents of the shadow L1 main cache and changing the size of the shadow L1 main cache.

In accordance with at least one example of the disclosure, an apparatus, includes a central processing unit (CPU) core and a level one (L1) cache subsystem coupled to the CPU core. The L1 cache subsystem includes a L1 main cache and a L1 controller. The L1 controller is configured to determine to change a size of the L1 main cache, service pending read requests and pending write requests from the CPU core, stall new read requests and new write requests from the CPU core, and write back and invalidate the L1 main cache. The apparatus also includes a level two (L2) cache subsystem coupled to the L1 cache subsystem. The L2 cache subsystem includes a L2 main cache, a shadow L1 main cache, and a L2 controller. The L2 controller is configured to receive an indication that the L1 main cache has been invalidated and, in response, flush a pipeline of the L2 controller; in response to the pipeline being flushed, stall requests received from any master; and reinitialize the shadow L1 main cache. Reinitializing includes clearing previous contents of the shadow L1 main cache and changing the size of the shadow L1 main cache.

In accordance with another example of the disclosure, a method includes receiving, by a level two (L2) controller, an indication that the a level one (L1) main cache has been invalidated and, in response, flushing a pipeline of the L2 controller; in response to the pipeline being flushed, stalling, by the L2 controller, requests received from any master; and reinitializing, by the L2 controller, a shadow L1 main cache. Reinitializing includes clearing previous contents of the shadow L1 main cache and changing the size of the shadow L1 main cache.

In accordance with at least one example of the disclosure, an apparatus includes a CPU core and a L1 cache subsystem coupled to the CPU core. The L1 cache subsystem includes a L1 main cache, a L1 victim cache, and a L1 controller. The apparatus includes a L2 cache subsystem coupled to the L1 cache subsystem. The L2 cache subsystem includes a L2 main cache, a shadow L1 main cache, a shadow L1 victim cache, and a L2 controller. The L2 controller receives an indication from the L1 controller that a cache line A is being relocated from the L1 main cache to the L1 victim cache; in response to the indication, update the shadow L1 main cache to reflect that the cache line A is no longer located in the L1 main cache; and in response to the indication, update the shadow L1 victim cache to reflect that the cache line A is located in the L1 victim cache.

In accordance with at least one example of the disclosure, a method includes receiving, by a level two (L2) controller of a L2 cache subsystem, an indication from a level one (L1) cache subsystem that a cache line A is being relocated from a L1 main cache to a L1 victim cache; in response to the indication, updating, by the L2 controller, a shadow L1 main cache of the L2 cache subsystem to reflect that the cache line A is no longer located in the L1 main cache; and in response to the indication, updating a shadow L1 victim cache of the L2 cache subsystem to reflect that the cache line A is located in the L1 victim cache.

In accordance with at least one example of the disclosure, a level two (L2) cache subsystem includes a L2 main cache; a shadow level one (L1) main cache; a shadow L1 victim cache; and a L2 controller. The L2 controller is configured to: receive an indication from a level one (L1) controller that a cache line A is being relocated from a L1 main cache to a L1 victim cache; in response to the indication, update the shadow L1 main cache to reflect that the cache line A is no longer located in the L1 main cache; and in response to the indication, update the shadow L1 victim cache to reflect that the cache line A is located in the L1 victim cache.

In accordance with at least one example of the disclosure, a system includes a non-coherent component; a coherent, non-caching component; a coherent, caching component; and a level two (L2) cache subsystem coupled to the non-coherent component, the coherent, non-caching component, and the coherent, caching component. The L2 cache subsystem includes a L2 cache; a shadow level one (L1) main cache; a shadow L1 victim cache; and a L2 controller. The L2 controller is configured to receive and process a first transaction from the non-coherent component; receive and process a second transaction from the coherent, non-caching component; and receive and process a third transaction from the coherent, caching component.

In accordance with another example of the disclosure, a method includes maintaining, by a level two (L2) cache controller, a L2 cache, a shadow level one (L1) main cache and a shadow L1 victim cache; receiving and processing, by the L2 cache controller, a first transaction from a non-coherent component; receiving and processing, by the L2 cache controller, a second transaction from a coherent, non-caching component; and receiving and processing, by the L2 cache controller, a third transaction from a coherent, caching component.

In accordance with at least one example of the disclosure, an apparatus includes a CPU core and a L1 cache subsystem including a L1 main cache, a L1 victim cache, and a L1 controller. The apparatus includes a L2 cache subsystem including a L2 main cache, a shadow L1 main cache, a shadow L1 victim cache, and a L2 controller configured to receive a read request from the L1 controller as a single transaction. Read request includes a read address, a first indication of an address and a coherence state of a cache line A to be moved from the L1 main cache to the L1 victim cache to allocate space for data returned in response to the read request, and a second indication of an address and a coherence state of a cache line B to be removed from the L1 victim cache in response to the cache line A being moved to the L1 victim cache.

In accordance with at least one example of the disclosure, a method includes receiving, by a level two (L2) controller, a read request from a level one (L1) controller as a single transaction. The read request includes a read address, a first indication of an address and a coherence state of a cache line A to be moved from a L1 main cache to a L1 victim cache to allocate space for data returned in response to the read request, and a second indication of an address and a coherence state of a cache line B to be removed from the L1 victim cache in response to the cache line A being moved to the L1 victim cache.

In accordance with at least one example of the disclosure, a level two (L2) cache subsystem, includes a L2 main cache, a shadow L1 main cache, a shadow L1 victim cache, and a L2 controller configured to receive a read request in a single transaction from a level one (L1) controller. The read request includes a read address, a first indication of an address and a coherence state of a cache line A to be moved from a L1 main cache to a L1 victim cache to allocate space for data returned in response to the read request, and a second indication of an address and a coherence state of a cache line B to be removed from the L1 victim cache in response to the cache line A being moved to the L1 victim cache.

In accordance with at least one example of the disclosure, an apparatus includes a CPU core and a L1 cache subsystem including a L1 main cache, a L1 victim cache, and a L1 controller. The apparatus includes a L2 cache subsystem coupled to the L1 cache subsystem by a transaction bus and a tag update bus. The L2 cache subsystem includes a L2 main cache, a shadow L1 main cache, a shadow L1 victim cache, and a L2 controller. The L2 controller receives a message from the L1 controller over the tag update bus, including a valid signal, an address, and a coherence state. In response to the valid signal being asserted, the L2 controller identifies an entry in the shadow L1 main cache or the shadow L1 victim cache having an address corresponding to the address of the message and updates a coherence state of the identified entry to be the coherence state of the message.

In accordance with at least one example of the disclosure, a method includes receiving, by a level two (L2) controller, a message from a level one (L1) controller over a tag update bus separate from a transaction bus between the L2 controller and the L1 controller, the message comprising a valid signal, an address, and a coherence state. The method also includes, in response to the valid signal being asserted, identifying, by the L2 controller, an entry in a shadow L1 main cache or a shadow L1 victim cache having an address corresponding to the address of the message; and updating, by the L2 controller, a coherence state of the identified entry to be the coherence state of the message.

In accordance with at least one example of the disclosure, an apparatus includes a central processing unit (CPU) core and a level one (L1) cache subsystem coupled to the CPU core. The L1 cache subsystem includes a L1 main cache, a L1 victim cache, and a L1 controller. The apparatus includes a level two (L2) cache subsystem coupled to the L1 cache subsystem by a transaction bus and a tag update bus. The L2 cache subsystem includes a L2 main cache, a shadow L1 main cache, a shadow L1 victim cache, and a L2 controller. The L2 controller is configured to receive a message from the L1 controller over the tag update bus, the message comprising a valid signal and an address. In response to the valid signal being asserted, the L2 controller identifies an entry in the shadow L1 victim cache having an address corresponding to the address of the message and updates a coherence state of the identified entry to be invalid.

In accordance with at least one example of the disclosure, a method includes receiving, by a level two (L2) controller, a first request for a cache line in a shared cache coherence state; mapping, by the L2 controller, the first request to a second request for a cache line in an exclusive cache coherence state; and responding, by the L2 controller, to the second request.

In accordance with at least one example of the disclosure, a method includes receiving, by a level two (L2) controller, a first request for a cache line in a shared cache coherence state; determining, by the L2 controller, that the cache line is not present in a L2 cache; mapping, by the L2 controller, the first request to a second request for a cache line in an exclusive cache coherence state; and forwarding, by the L2 controller, the second request.

In accordance with at least one example of the disclosure, an apparatus includes a central processing unit (CPU) core, a level one (L1) cache subsystem coupled to the CPU core, and a level two (L2) cache subsystem coupled to the L1 cache subsystem. The L2 cache subsystem includes a L2 main cache and a L2 controller. The L2 controller is configured to receive a first request for a cache line in a shared cache coherence state, map the first request to a second request for a cache line in an exclusive cache coherence state, and respond to the second request.

BRIEF DESCRIPTION OF THE DRAWINGS

For a detailed description of various examples, reference will now be made to the accompanying drawings in which:

FIGS. 4a-4f show flow charts of methods for processing various transaction types in accordance with various examples;

FIG. 9 shows a table of sideband signaling protocol data in accordance with various examples;

FIG. 10 shows a table of tag update protocol data in accordance with various examples;

DETAILED DESCRIPTION

Figure 1:
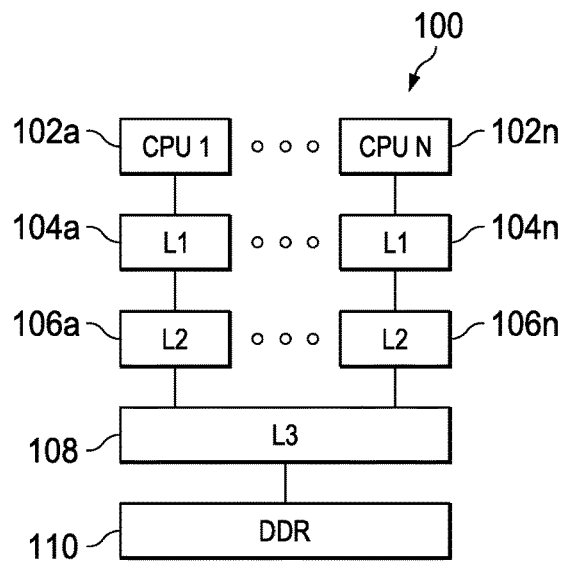
FIG. 1 shows a block diagram of a multi-level cache system in accordance with various examples.

FIG. 1 shows a block diagram of a system 100 in accordance with an example of this disclosure. The example system 100 includes multiple CPU cores 102a-102n. Each CPU core 102a-102n is coupled to a dedicated L1 cache 104a-104n and a dedicated L2 cache 106a-106n. The L2 caches 106a-106n are, in turn, coupled to a shared third level (L3) cache 108 and a shared main memory 110 (e.g., double data rate (DDR) random-access memory (RAM)). In other examples, a single CPU core 102 is coupled to a L1 cache 104, a L2 cache 106, a L3 cache 108, and main memory 110.

In some examples, the CPU cores 102a-102n include a register file, an integer arithmetic logic unit, an integer multiplier, and program flow control units. In an example, the L1 caches 104a-104n associated with each CPU core 102a-102n include a separate level one program cache (L1P) and level one data cache (L1D). The L2 caches 106a-106n are combined instruction/data caches that hold both instructions and data. In certain examples, a CPU core 102a and its associated L1 cache 104a and L2 cache 106a are formed on a single integrated circuit.

The CPU cores 102a-102n operate under program control to perform data processing operations upon data. Instructions are fetched before decoding and execution. In the example of FIG. 1, L1P of the L1 cache 104a-104n stores instructions used by the CPU cores 102a-102n. A CPU core 102 first attempts to access any instruction from L1P of the L1 cache 104. L1D of the L1 cache 104 stores data used by the CPU core 102. The CPU core 102 first attempts to access any required data from L1 cache 104. The two L1 caches 104 (L1P and L1D) are backed by the L2 cache 106, which is a unified cache. In the event of a cache miss to the L1 cache 104, the requested instruction or data is sought from L2 cache 106. If the requested instruction or data is stored in the L2 cache 106, then it is supplied to the requesting L1 cache 104 for supply to the CPU core 102. The requested instruction or data is simultaneously supplied to both the requesting cache and CPU core 102 to speed use.

The unified L2 cache 106 is further coupled to a third level (L3) cache 108, which is shared by the L2 caches 106a-106n in the example of FIG. 1. The L3 cache 108 is in turn coupled to a main memory 110. As will be explained in further detail below, memory controllers facilitate communication between various ones of the CPU cores 102, the L1 caches 104, the L2 caches 106, the L3 cache 108, and the main memory 110. The memory controller(s) handle memory centric functions such as cacheability determination, cache coherency implementation, error detection and correction, address translation and the like. In the example of FIG. 1, the CPU cores 102 are part of a multiprocessor system, and thus the memory controllers also handle data transfer between CPU cores 102 and maintain cache coherence among CPU cores 102. In other examples, the system 100 includes only a single CPU core 102 along with its associated L1 cache 104 and L2 cache 106.

Figure 2:
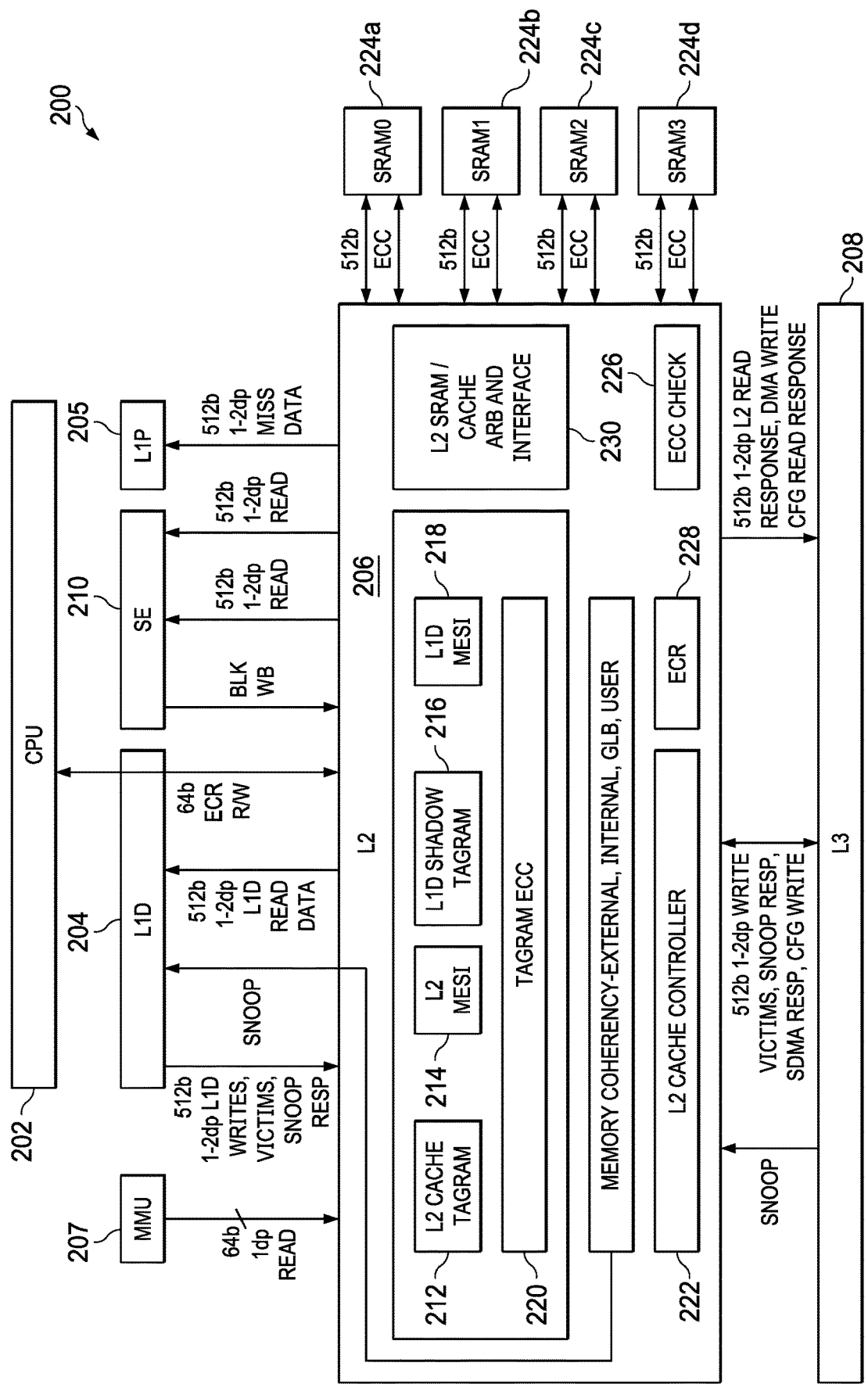
FIG. 2 shows another block diagram of a multi-level cache system in accordance with various examples.

FIG. 2 shows a block diagram of a system 200 in accordance with examples of this disclosure. Certain elements of the system 200 are similar to those described above with respect to FIG. 1, although shown in greater detail. For example, a CPU core 202 is similar to the CPU core 102 described above. The L1 cache 104 subsystem described above is depicted as L1D 204 and L1 P 205. The L2 cache 106 described above is shown here as L2 cache subsystem 206. An L3 cache 208 is similar to the L3 cache 108 described above. The system 200 also includes a streaming engine 210 coupled to the L2 cache subsystem 206. The system 200 also includes a memory management unit (MMU) 207 coupled to the L2 cache subsystem 206.

The L2 cache subsystem 206 includes L2 tag ram 212, L2 coherence (e.g., MESI) data 214, shadow L1 tag ram 216, and L1 coherence (e.g., MESI) data 218. Each of the blocks 212, 214, 216, 218 are alternately referred to as a memory or a RAM. The L2 cache subsystem 206 also includes tag ram error correcting code (ECC) data 220. In an example, the ECC data 220 is maintained for each of the memories 212, 214, 216, 218.

The L2 cache subsystem 206 includes L2 controller 222, the functionality of which will be described in further detail below. In the example of FIG. 2, the L2 cache subsystem 206 is coupled to memory (e.g., L2 SRAM 224) including four banks 224a-224d. An interface 230 performs data arbitration functions and generally coordinates data transmission between the L2 cache subsystem 206 and the L2 SRAM 224, while an ECC block 226 performs error correction functions. The L2 cache subsystem 206 includes one or more control or configuration registers 228.

In the example of FIG. 2, the L2 SRAM is depicted as four banks 224a-224d. However, in other examples, the L2 SRAM includes more or fewer banks, including being implemented as a single bank. The L2 SRAM 224 serves as the L2 cache and is alternately referred to herein as L2 cache 224.

The L2 tag ram 212 includes a list of the physical addresses whose contents (e.g., data or program instructions) have been cached to the L2 cache 224. In an example, an address translator translates virtual addresses to physical addresses. In one example, the address translator generates the physical address directly from the virtual address. For example, the lower n bits of the virtual address are used as the least significant n bits of the physical address, with the most significant bits of the physical address (above the lower n bits) being generated based on a set of tables configured in main memory. In this example, the L2 cache 224 is addressable using physical addresses. In certain examples, a hit/miss indicator from a tag ram 212 look-up is stored.

The L2 MESI memory 214 maintains coherence data to implement full MESI coherence with L2 SRAM 224, external shared memories, and data cached in L2 cache from other places in the system 200. The functionalities of system 200 coherence are explained in further detail below.

The L2 cache subsystem 206 also shadows L1D tags in the L1D shadow tag ram 216 and L1D MESI memory 218. The tag ram ECC data 220 provides error detection and correction for the tag memories and, additionally, for one or both of the L2 MESI memory 214 and the L1D MESI memory 218. The L2 cache controller 222 generally controls the operations of the L2 cache subsystem 206, including handling coherency operations both internal to the L2 cache subsystem 206 and among the other components of the system 200.

Figure 3:
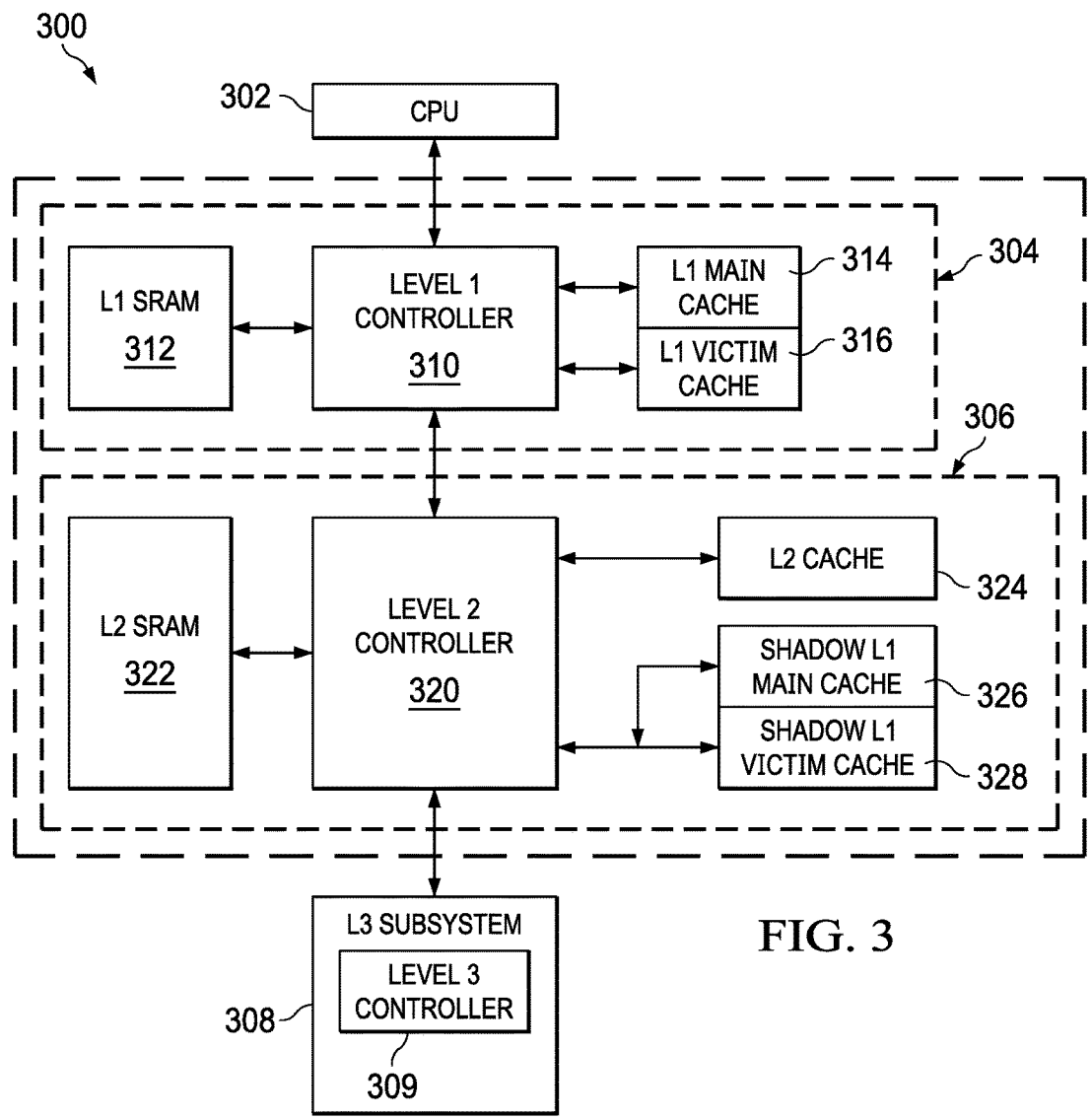
FIG. 3 shows another block diagram of a multi-level cache system including level one (L1) main and victim caches in accordance with various examples.

FIG. 3 shows a block diagram of a system 300 that demonstrates various features of cache coherence implemented in accordance with examples of this disclosure. The system 300 contains elements similar to those described above with respect to FIGS. 1 and 2. For example, the CPU core 302 is similar to the CPU cores 102, 202. FIG. 3 also includes a L1 cache subsystem 304, a L2 cache subsystem 306, and an L3 cache subsystem 308. The L1 cache subsystem 304 includes a L1 controller 310 coupled to L1 SRAM 312. The L1 controller 310 is also coupled to a L1 main cache 314 and a L1 victim cache 316, which are explained in further detail below. In some examples, the L1 main and victim caches 314, 316 implement the functionality of L1D 204 and/or L1P 205.

The L1 controller 310 is coupled to a L2 controller 320 of the L2 cache subsystem 306. The L2 controller 320 also couples to L2 SRAM 322. The L2 controller 320 couples to a L2 cache 324 and to a shadow of the L1 main cache 326 as well as a shadow of the L1 victim cache 328. L2 cache 324 and L2 SRAM 322 are shown separately for ease of discussion, although may be implemented physically together (e.g., as part of L2 SRAM 224, including in a banked configuration, as described above. Similarly, the shadow L1 main cache 326 and the shadow L1 victim cache 328 may be implemented physically together, and are similar to the L1D shadow tag ram 216 and the L1D MESI 218, described above. The L2 controller 320 is also coupled to a L3 controller 309 of the L3 cache subsystem 308. L3 cache and main memory (e.g., DDR 110 described above) are not shown for simplicity.

Cache coherence is a technique that allows data and program caches, as well as different requestors (including requestors that do not have caches) to determine the most current data value for a given address in memory. Cache coherence enables this coherent data value to be accurately reflected to observers (e.g., a cache or requestor that issues commands to read a given memory location) present in the system 300. Certain examples of this disclosure refer to an exemplary MESI coherence scheme, in which a cache line is set to one of four cache coherence states: modified, exclusive, shared, or invalid. Other examples of this disclosure refer to a subset of the MESI coherence scheme, while still other examples include more coherence states than the MESI coherence scheme. Regardless of the coherence scheme, cache coherence states for a given cache line are stored in, for example, the L2 MESI memory 214 described above.

A cache line having a cache coherence state of modified indicates that the cache line is modified with respect to main memory (e.g., DDR 110), and the cache line is held exclusively in the current cache (e.g., the L2 cache 324). A modified cache coherence state also indicates that the cache line is explicitly not present in any other caches (e.g., L1 or L3 caches).

A cache line having a cache coherence state of exclusive indicates that the cache line is not modified with respect to main memory (e.g., DDR 110), but the cache line is held exclusively in the current cache (e.g., the L2 cache 324). An exclusive cache coherence state also indicates that the cache line is explicitly not present in any other caches (e.g., L1 or L3 caches).

A cache line having a cache coherence state of shared indicates that the cache line is not modified with respect to main memory (e.g., DDR 110). A shared cache state also indicates that the cache line may be present in multiple caches (e.g., caches in addition to the L2 cache 324).

A cache line having a cache coherence state of invalid indicates that the cache line is not present in the cache (e.g., the L2 cache 324).

Examples of this disclosure leverage hardware techniques, control logic, and/or state information to implement a coherent system. Each observer can issue read requests—and certain observers are able to issue write requests—to memory locations that are marked shareable. Caches in particular can also have snoop requests issued to them, requiring their cache state to be read, returned, or even updated, depending on the type of the snoop operation. In the exemplary multi-level cache hierarchy described above, the L2 cache subsystem 306 is configured to both send and receive snoop operations. The L1 cache subsystem 304 receives snoop operations, but does not send snoop operations. The L3 cache subsystem 308 sends snoop operations, but does not receive snoop operations. In examples of this disclosure, the L2 cache controller 320 maintains state information (e.g., in the form of hardware buffers, memories, and logic) to additionally track the state of coherent cache lines present in both the L1 main cache 314 and the L1 victim cache 316. Tracking the state of coherent cache lines enables the implementation of a coherent hardware cache system.

Examples of this disclosure refer to various types of coherent transactions, including read transactions, write transactions, snoop transactions, victim transactions, and cache maintenance operations (CMO). These transactions are at times referred to as reads, writes, snoops, victims, and CMOs, respectively.

Reads return the current value for a given address, whether that value is stored at the endpoint (e.g., DDR 110), or in one of the caches in the coherent system 300. Writes update the current value for a given address, and invalidate other copies for the given address stored in caches in the coherent system 300. Snoops read or invalidate (or both) copies of data stored in caches. Snoops are initiated from a numerically-higher level of the hierarchy to a cache at the next, numerically-lower level of the hierarchy (e.g., from the L2 controller 320 to the L1 controller 310), and are able be further propagated to even lower levels of the hierarchy as needed. Victims are initiated from a numerically-lower level cache in the hierarchy to the next, numerically-higher level of the cache hierarchy (e.g., from the L1 controller 310 to the L2 controller 320). Victims transfer modified data to the next level of the hierarchy. In some cases, victims are further propagated to numerically-higher levels of the cache hierarchy (e.g., if the L2 controller 310 sends a victim to the L2 controller 320 for an address in the DDR 110, and the line is not present in the L2 cache 324, the L2 controller 320 forwards the victim to the L3 controller 309). Finally, CMOs cause an action to be taken in one of the caches for a given address.

Still referring to FIG. 3, in one example, the L1 main cache 314 is a direct mapped cache that services read and write hits and snoops. The L1 main cache 314 also keeps track of cache coherence state information (e.g., MESI state) for its cache lines. In an example, the L1 main cache 314 is a read-allocate cache. Thus, writes that miss the L1 main cache 314 are sent to L2 cache subsystem 306 without allocating space in the L1 main cache 314. In the example where the L1 main cache 314 is direct mapped, when a new allocation takes place in the L1 main cache 314, the current line in the set is moved to the L1 victim cache 316, regardless of whether the line is clean (e.g., unmodified) or dirty (e.g., modified).

In an example, the L1 victim cache 316 is a fully associative cache that holds cache lines that have been removed from the L1 main cache 314, for example due to replacement. The L1 victim cache 316 holds both clean and dirty lines. The L1 victim cache 316 services read and write hits and snoops. The L1 victim cache 316 also keeps track of cache coherence state information (e.g., MESI state) for its cache lines. When a cache line in the modified state is replaced from the L1 victim cache 316, that cache line is sent to the L2 cache subsystem 306 as a victim.

As explained above, the L2 cache subsystem 306 includes a unified L2 cache 324 that is used to service requests from multiple requestor types, including L1 D and L1 P (through the L1 controller 310), the streaming engine 210, a memory management unit (MMU 207), and the L3 cache (through the L3 controller 309). In an example, the L2 cache 324 is non-inclusive with the L1 cache subsystem 304, which means that the L2 cache 324 is not required to include all cache lines stored in the L1 caches 314, 316, but that some lines may be cached in both levels. Continuing this example, the L2 cache 324 is also non-exclusive, which means that cache lines are not explicitly prevented from being cached in both the L1 and L2 caches 314, 316, 324. For example, due to allocation and random replacement, cache lines may be present in one, both, or neither of the L1 and L2 caches. The combination of non-inclusive and non-exclusive cache policies enables the L2 controller 320 to manage its cache contents without requiring the L1 controller 310 to invalidate or remove cache lines. This simplifies processing in the L2 cache subsystem 306 and enables increased performance for the CPU core 302 by allowing critical data to remain cached in the L1 cache subsystem 304 even if it has been evicted from the L2 cache 324.

Still referring to FIG. 3, the L2 controller 320 described herein combines both local coherence (e.g., handling requests targeting its local L2 SRAM 322 as an endpoint) and external coherence (e.g., handling requests targeting external memories, such as L3 SRAM (not shown for simplicity) or DDR 110 as endpoints). An endpoint refers to a memory target such as L2 SRAM 322 or DDR 110 that resides at a particular location on the chip, is acted upon directly by a single controller and/or interface, and may be cached at various levels of a coherent cache hierarchy, such as depicted in FIG. 3. A master (e.g., a hardware component, circuitry, or the like) refers to a requestor that issues read and write accesses to an endpoint. In some examples, a master stores the results of these read and write accesses in a cache, although the master does not necessarily store such results in a cache.

Local coherence requests are received by the L2 controller 320 from, for example, the CPU core 302 or as a direct memory access (DMA) request from another CPU core or a master associated with another CPU core. External coherence requests are received by the L2 controller 320 from, for example, the CPU core 302 or L3 controller 309. Thus, the single L2 controller 320 is configured to address both local and external coherence.

In accordance with various examples, the L2 controller 320 manages the CPU core 302 coherent view of three endpoints: L2 SRAM 322, L3 SRAM (part of the L3 cache subsystem 308, not shown for simplicity), and main memory or DDR 110, described above. For ease of discussion, L3 SRAM and DDR 110 are grouped together and referred to as an "external" memory or endpoint, which distinguishes them from the L2 SRAM 322 as a "local" (e.g., to the L2 controller 320) memory or endpoint.

A master refers to a requestor that issues read and write accesses to an endpoint. In some examples, a master stores the results of these read and write accesses in a cache, although the master does not necessarily store such results in a cache. Coherent masters (e.g., masters for whom coherence must be handled by L2 controller 320) are classified as either caching or non-caching. Non-coherent masters (e.g., masters that do not require coherent data) are not distinguished as caching or non-caching due to their being non-coherent. Referring briefly back to FIG. 2, in some examples non-coherent masters include L1P 205. Coherent, non-caching masters include MMU 207, SE 210, and L3 208. Coherent, caching masters include L1D 204.

The L2 controller 320 is configured to provide coherent access to both internal and external endpoints for coherent masters, while also providing access to those internal and external endpoints for non-coherent masters. As will be explained in further detail below, the L2 controller manages coherent state information, issues coherence transactions (e.g., snoop, victim) to maintain proper coherence states, and propagates information as needed to the downstream controllers such as the L3 controller 309 to provide a coherent view of the memory stored in the L2 cache subsystem 306.

As will be explained further below, the L2 controller 320 is configured to perform normal cache allocation, replacement, and victimization operations, while also sending coherent transactions to communicate the storage of coherent locations within the L2 cache subsystem 306 or L1 cache subsystem 304. As a result, downstream cache controllers such as the L3 controller 309 are able to maintain the directory information, if so enabled, about what addresses are held in the L1 and L2 cache subsystems 304, 306.

In accordance with examples of this disclosure, the L2 controller 320 is part of a system that includes a non-coherent master; a non-caching, coherent master; and a caching, coherent master. The L2 controller 320 is configured to receive and process transactions from each of these masters, while maintaining global coherence (e.g., with respect to external memories) and local coherence (e.g., with respect to its local memory) as required by the particular master. Thus, the L2 controller 320 also enables interleaving of coherent and non-coherent traffic among the various masters.

The following table summarizes interactions between various masters and the L2 controller 320 in accordance with various examples. In particular, Table 1 indicates for a particular master what transaction types that master can initiate to the L2 controller 320, what transaction types the L2 controller 320 can initiate to that master, and whether global and/or local coherence is supported by the L2 controller 320 for that master.

TABLE 1

| Master | Master-initiated transaction | L2-initiated transaction | Global coherence? | Local coherence? |
|---|---|---|---|---|
| L1P 205 | Read | None | No | Yes |
| MMU 207 | Read | None | Yes | Yes |
| SE 210 | Read, CMO | None | Yes | Yes |
| L1D 204 | R, W, Victim | Snoop | Yes | Yes |
| L3 208 | Snoop | R, W, Victim | Yes | No |
| DMA | Read, Write | None | No | Yes |

FIG. 4a shows a method 400 carried out by the L2 controller 320 in response to a read request from a non-coherent master, such as L1P 205. The method 400 begins in block 402 with the L2 controller 320 receiving a read request from a non-coherent master, and continues in block 404 with reading data from an endpoint based on the read request. Although not explicitly shown, if the read request hits in the L2 cache 324, the L2 controller 320 is configured to read the data from the L2 cache 324. On the other hand, if the read request does not hit in the L2 cache 324, the L2 controller 320 is configured to read the data from an endpoint, such as the L3 cache subsystem 308 or DDR 110. Once the L2 controller 320 has read response data (either from L2 cache 324 or from an endpoint), the method 400 continues to block 406 in which the L2 controller 320 returns the read response data to the non-coherent master.

FIG. 4b shows a method 410 carried out by the L2 controller 320 in response to a read request from a coherent, non-caching master, such as MMU 207, SE 210, and L3 208. When coherent, non-caching masters issue read commands to the L2 controller 320, either to a local endpoint or external endpoint, the L2 controller 320 determines if the line is present in the L1 cache 314, 316, and if so, whether a snoop command should be issued to obtain the latest copy from L1 caches 314, 316, or if the data can be obtained from the endpoint (e.g., L2 SRAM 322) or the L2 cache 324 (if present). Due to variations in access latency for a local endpoint (faster) compared to an external endpoint (slower), the L2 controller 320 makes multiple decisions for where and how to obtain a coherent memory location in response to a read command from a non-caching master.

The method 410 begins in block 412 with the L2 controller 320 receiving a read request from a coherent, non-caching master, and continues in block 414 with the L2 controller 320 determining whether the read request hits in the shadow L1 main cache 326 or the shadow L1 victim cache 328, which indicates that the requested data may be present in the L1 cache subsystem 304.

If, in block 414, the read request does not hit in the shadow L1 caches 326, 328, the method 410 continues in block 416 in which the L2 controller 320 reads the data from an endpoint and returns the data as a read response. However, if in block 414 the read request hits one of the shadow L1 caches 326, 328, the method 410 continues in block 418 with the L2 controller 320 generating a snoop read to the L1 controller 310. If a snoop response from the L1 controller 310 contains valid data in block 420, then the L2 controller 320 returns the snoop response data as a read response to the requesting master in block 422. If the snoop response from the L1 controller 310 contains invalid data in block 420, then the L2 controller 320 returns endpoint data as the read response to the requesting master in block 416.

Figure 4C:
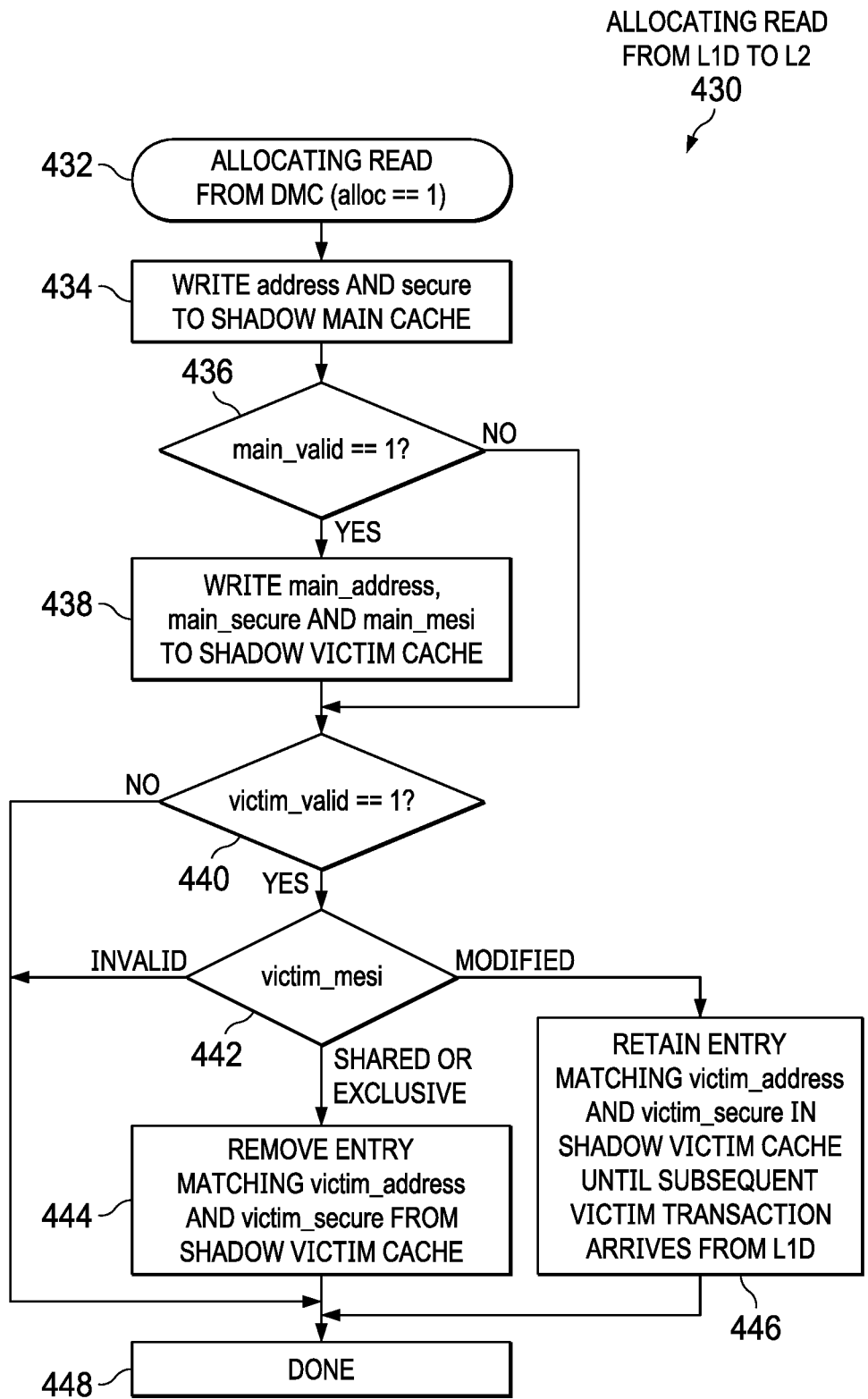

FIG. 4c shows a method 430 carried out by the L2 controller 320 in response to a read request from a coherent, caching master, such as L1D 204. The method 430 makes reference to various sideband signals that describe allocations that will occur in the L1 cache subsystem 304 (e.g., movements of cache lines in L1 main cache 314 and L1 victim cache 316) as a result of the read request. These sideband signals are described in further detail below with respect to FIG. 9.

In particular, the method 430 begins in block 432 with the L2 controller 320 receiving an allocating read request from a coherent, caching master, which in this examples is the L1 cache subsystem 304. This read request includes sideband signals that indicate it is an allocating request (e.g., alloc=1). The method 430 then proceeds to block 434 in which the L2 controller 320 writes an address and, optionally, a secure bit, indicated by the sideband signals to the shadow L1 main cache 326, which now indicates the address that is being allocated to the L1 main cache 314 as a result of this read request.

The method 430 continues in block 436 with determining whether a main_valid sideband signal is asserted, which indicates that a cache line is moving from the L1 main cache 314 to the L1 victim cache 316 as a result of this read request. If the main_valid signal is asserted, the method 430 continues to block 438 in which the L2 controller 320 updates its shadow L1 victim cache 328 to include an address specified by main_address, a coherence state specified by main_mesi, and optionally a secure bit specified by main_secure. As a result, the shadow L1 victim cache 328 now includes the address and coherence state information of the line that is being moved from the L1 main cache 314 to the L1 victim cache 316 as a result of this read request.

If the main_valid signal is de-asserted, then a line is not being moved from the L1 main cache 314 to the L1 victim cache 316 as a result of this read request, and the method 430 continues to block 440 with determining whether a victim_valid sideband signal is asserted, which indicates that a cache line is moving out of the L1 victim cache 316 as a result of this read request (e.g., is being displaced by the L1 main cache 314 to L1 victim cache 316 movement described above). If the victim_valid signal is asserted, the method 430 continues in block 442 with determining whether the coherence state specified by victim_mesi (e.g., the coherence state of the line being moved out of the L1 victim cache 316) is invalid, modified, or shared/exclusive.

If victim_mesi is invalid, the method 430 proceeds to block 448 in which the L2 controller 320 returns read response data from an endpoint, or the L2 cache 324.

If victim_mesi is shared/exclusive, the method 430 continues to block 444 where the L2 controller 320 removes an entry from its shadow L1 victim cache 328 having an address that matches victim_address and, optionally, victim_secure. As explained further below, the L2 controller 320 removes the entry in this case because a subsequent victim transaction from the L1 controller 310 does not result when the line evicted from L1 victim cache 316 is in the shared/exclusive state, and thus it is safe to also remove from the shadow L1 victim cache 328. The method 430 then proceeds to block 448 in which the L2 controller 320 returns read response data from an endpoint, or the L2 cache 324.

If victim_mesi is modified, the method 430 continues to block 446 where the L2 controller 320 retains an entry from its shadow L1 victim cache 328 having an address that matches victim_address and, optionally, victim_secure. As explained further below, the L2 controller 320 retains the entry in this case because a subsequent victim transaction from the L1 controller 310 is expected when the line evicted from L1 victim cache 316 is in the modified state. The method 430 then proceeds to block 448 in which the L2 controller 320 returns read response data from an endpoint, or the L2 cache 324.

Figures 4D, 4E:
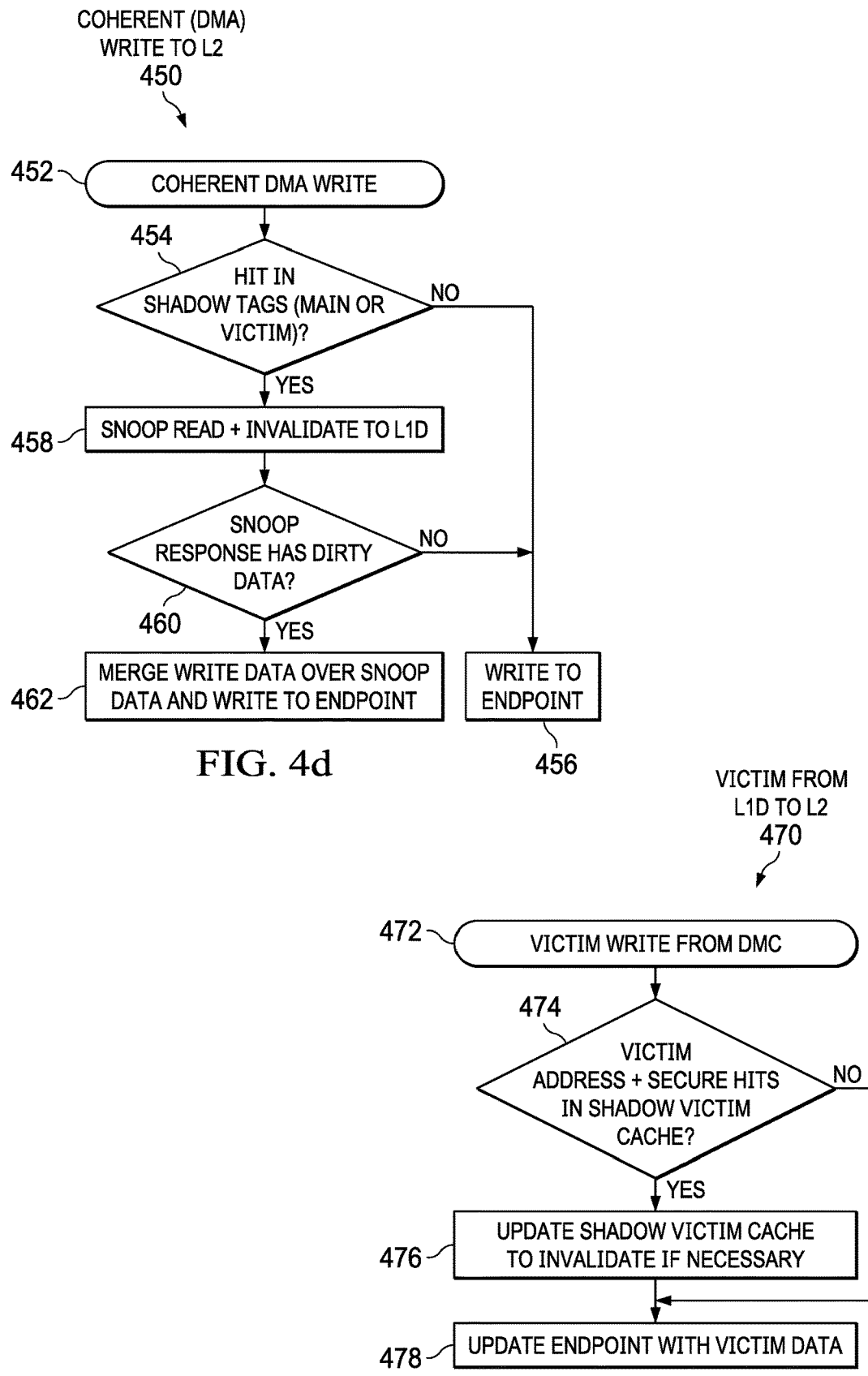

FIG. 4d shows a method 450 carried out by the L2 controller 320 in response to a write request from a coherent, non-caching master, such as a DMA request from a different CPU core. The method 450 begins in block 452 when the write request is received and continues to block 454 with the L2 controller 320 determining whether the write request hits in the shadow L1 main or victim caches 326, 328. If the write request does not hit in the shadow L1 main or victim caches 326, 328, then the L2 controller 320 does not need to invalidate any line in the L1 cache subsystem 304 and the method 450 proceeds to block 456 where the L2 controller 320 writes the data to an endpoint.

However, if the write request hits in the shadow L1 main or victim caches 326, 328, then the method 450 proceeds to block 458 in which the L2 controller 320 issues a snoop read and invalidate request to the L1 cache subsystem 304. If the snoop response has dirty (e.g., modified) data in block 460, then the L2 controller 320 merges the write data over the snoop response data and writes to an endpoint in block 462. If the snoop response contains unmodified data in block 460, then the L2 controller 320 writes the write data to the endpoint in block 456.

FIG. 4e shows a method 470 carried out by the L2 controller 320 in response to a victim from a L1D 204, which is a coherent, caching master. The method 470 begins in block 472 with the L2 controller 320 receiving a victim from the L1 controller 310. If a victim address and, optionally, secure bit hits in the shadow L1 victim cache 328 in block 474, the L2 controller 320 is configured to update the shadow L1 victim cache 328 to invalidate a corresponding address if necessary. The method 470 then continues in block 478, in which the L2 controller 320 updates an endpoint with the victim data. However, if the victim address and, optionally, secure bit does not hit in the shadow L1 victim cache 328 in block 474, then the method 470 proceeds to block 478 and the L2 controller 320 updates an endpoint with the victim data without modifying the shadow L1 victim cache 328.

Figure 4F:
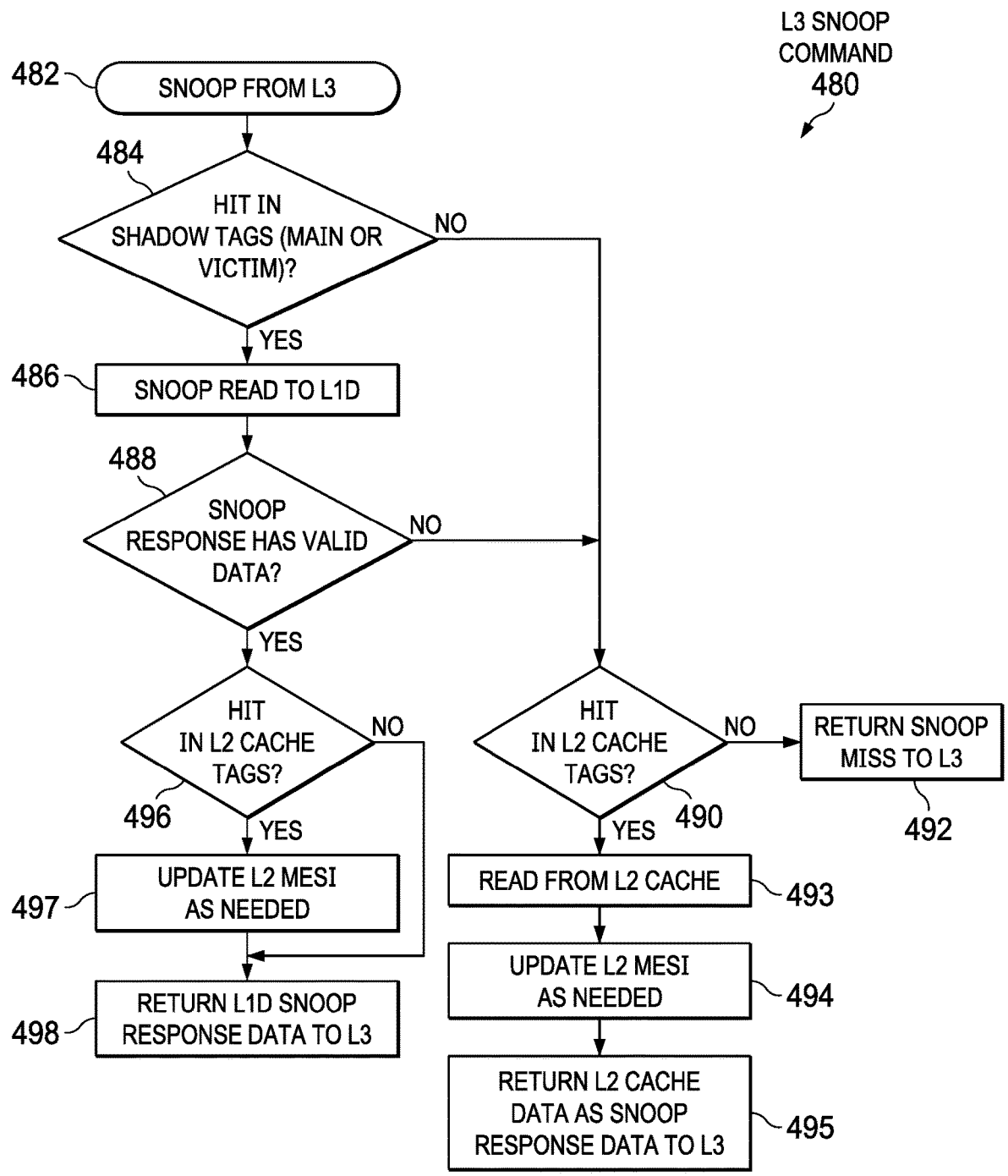

FIG. 4f shows a method 480 carried out by the L2 controller 320 in response to a snoop command from L3 208, which is a coherent, non-caching master. The method 480 begins in block 482 in which the L2 controller 320 receives a snoop request from the L3 controller 309. If, in block 484, the snoop request hits in the shadow L1 main or victim caches 326, 328, the method 480 continues in block 486 with the L2 controller 320 issuing a snoop read 486 to the L1 controller 310. The method 480 then continues in block 488 with the L2 controller 320 determining whether the snoop response from the L1 controller 310 has valid data.

If the snoop response from the L1 controller 310 contains invalid data (or if the snoop request did not hit in the shadow L1 main or victim caches 326, 328 in block 484), the method 480 continues to block 490 in which the L2 controller 320 determines whether the snoop read hits in the L2 cache 324. If the snoop read does not hit in the L2 cache 324, the method 480 continues to block 492 and the L2 controller 320 issues a snoop miss to the L3 controller 309. However, if the snoop read hits in the L2 cache 324, the method 480 continues to block 493 in which the L2 controller 320 reads the data from the L2 cache 324 and to block 494 in which the L2 controller 320 updates a coherence state as needed. Then the L2 controller 320 returns the data from the L2 cache 324 as snoop response data to the L3 controller 309 in block 495.

If the snoop response from the L1 controller 310 contains valid data in block 488, the method 480 continues to block 496 in which the L2 controller 320 determines whether the snoop response from the L1 controller 310 hits in the L2 cache 324. If the snoop response from the L1 controller 310 hits in the L2 cache 324, the method 480 continues to block 497 in which the L2 controller 320 updates a coherence state of the L2 cache 324 as needed. Then, the L2 controller 320 returns the snoop response data from the L1 controller 310 as a snoop response to the L3 controller 309 in block 498. If the snoop response from the L1 controller 310 does not hit in the L2 cache 324, the method 480 proceeds directly to block 498, in which the L2 controller 320 returns the snoop response data from the L1 controller 310 as a snoop response to the L3 controller 309.

The foregoing are examples of ways in which the L2 controller 320 receives and processes various types of transactions from various types of masters, including non-coherent masters; coherent, non-caching masters; and coherent, caching masters. By handling such diverse combinations of transactions and master requirements in a single, unified controller, overall system flexibility is enhanced.

As explained, there is a need for the L2 cache subsystem 306 to include hardware, control logic, and/or state information to allow the L2 controller at 320 to accurately track and process the state of coherent, cache lines in the lower-level L1 cache subsystem 304. In this example, the L1 cache subsystem 304 is utilizing a heterogeneous cache system, including the L1 main cache 314 and the L1 victim cache 316. Examples of this disclosure allow the L2 controller 320 to maintain appropriate state information to accurately track the state of all coherent cache lines present in both the L1 main cache 314 and L1 victim cache 316.

Figure 5:
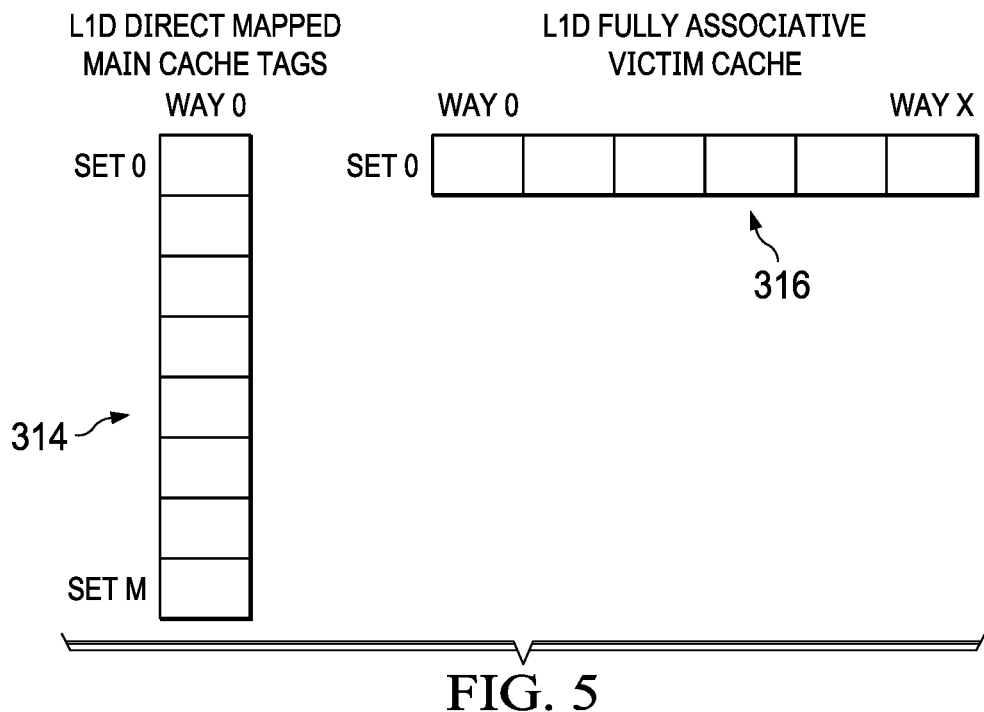
FIG. 5 shows an example organization of the L1 main cache and the L1 victim cache in accordance with various examples.

FIG. 5 shows an example of the L1 main cache 314 and the L1 victim cache 316. In this example, as explained above, the L1 main cache 314 is a direct mapped cache, which thus has one way (Way 0) and sets 0 through M. Continuing this example, as explained above, the L1 victim cache 316 is a fully associative cache, which thus has one set (Set 0) and ways 0 through X.

Figure 6:
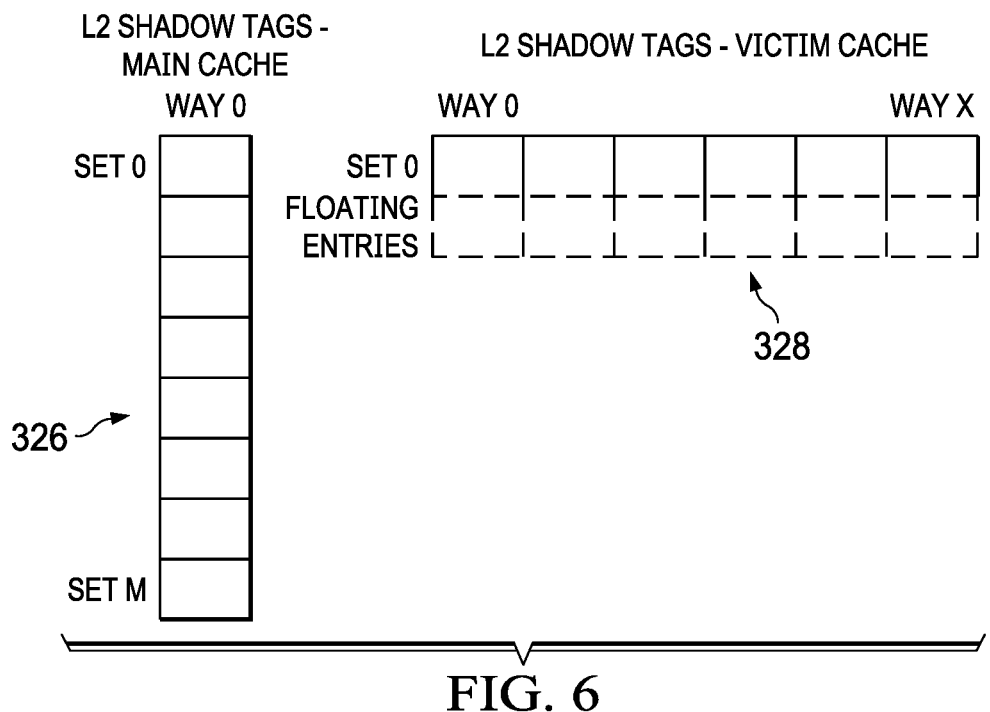
FIG. 6 shows an example organization of level two (L2) shadow L1 main cache and shadow L1 victim cache in accordance with various examples.

FIG. 6 shows an example of the shadow L1 main cache 326 and the shadow L1 victim cache 328, contained in the L2 cache subsystem 306. The shadow L1 main cache 326 is a shadow copy of the address tag and MESI state information for the cache lines held in the L1 main cache 314. The maintenance of this shadow copy enables the L2 controller 320 to track the lines that are cached in the L1 main cache 314, for example to correctly decide when to send snoop transactions to either read or invalidate cache lines in the L1 main cache 314. In this example, the shadow L1 main cache 326 also has one way (Way 0) and sets 0 through M, permitting the shadow L1 main cache 326 to reflect the L1 main cache 314.

The shadow L1 victim cache 328 is a shadow copy of the address tag and MESI state information for the cache lines held in the L1 victim cache 316. As above with respect to the shadow L1 main cache 326, the maintenance of the shadow L1 victim cache 328 enables the L2 controller 320 to accurately determine when to send snoop transactions to the L1 controller 310. For example, if the shadow tags were not maintained in the L2 cache subsystem 306, then the L2 controller 320 would need to snoop the L1 cache subsystem 304 for each request that could possibly be held in the L1 main or victim caches 314, 316, which could reduce performance due to the resulting snoop traffic bandwidth. In this example, the shadow L1 victim cache 328 includes one set (Set 0) and ways 0 through X, along with floating entries, which render the shadow L1 victim cache 328 to reflect more entries than can be stored in the L1 victim cache 316. The floating entries are explained in further detail below.

In both the shadow L1 main cache 326 and the shadow L1 victim cache 328, only the tag (e.g., address) and coherence state information is shadowed. That is, in at least this example, it is not necessary to shadow the cached data itself.

When the L2 controller 320 receives a snoop transaction or a read or write transaction occurs from the L3 controller 310 to the L2 controller 320, the L2 controller 320 first checks the shadow L1 main and shadow L1 victim caches 326, 328. If a match is found (e.g., a hit), then the L2 controller 320 initiates a snoop transaction to the L1 controller 310. When the snoop transaction returns, the L2 controller 320 uses the snoop response to update the shadow L1 main and shadow L1 victim caches 326, 328, if necessary.

Similarly, when the L1 controller 310 allocates a line in its L1 main cache 314, or moves or relocates a line from the L1 main cache 314 to the L1 victim cache 316, the L1 controller 310 communicates such movement to the L2 controller 320 to enable the L2 controller 320 to update the shadow L1 main and shadow L1 victim caches 326, 328. When the L1 controller 310 evicts a line from either the L1 main cache 314 or the L1 victim cache 316, the line is either modified (e.g., dirty) or unmodified (e.g., clean) with respect to main memory (e.g., DDR 110). The L1 controller 310 is configured to communicate both clean line evictions and dirty line victims to the L2 controller 320, which enables the L2 controller 320 to accurately update its shadow L1 main and shadow L1 victim caches 326, 328. The signaling protocol to communicate such movement, relocation, and evictions between the L1 controller 310 and the L2 controller 320 is discussed in further detail below.

Figure 7:
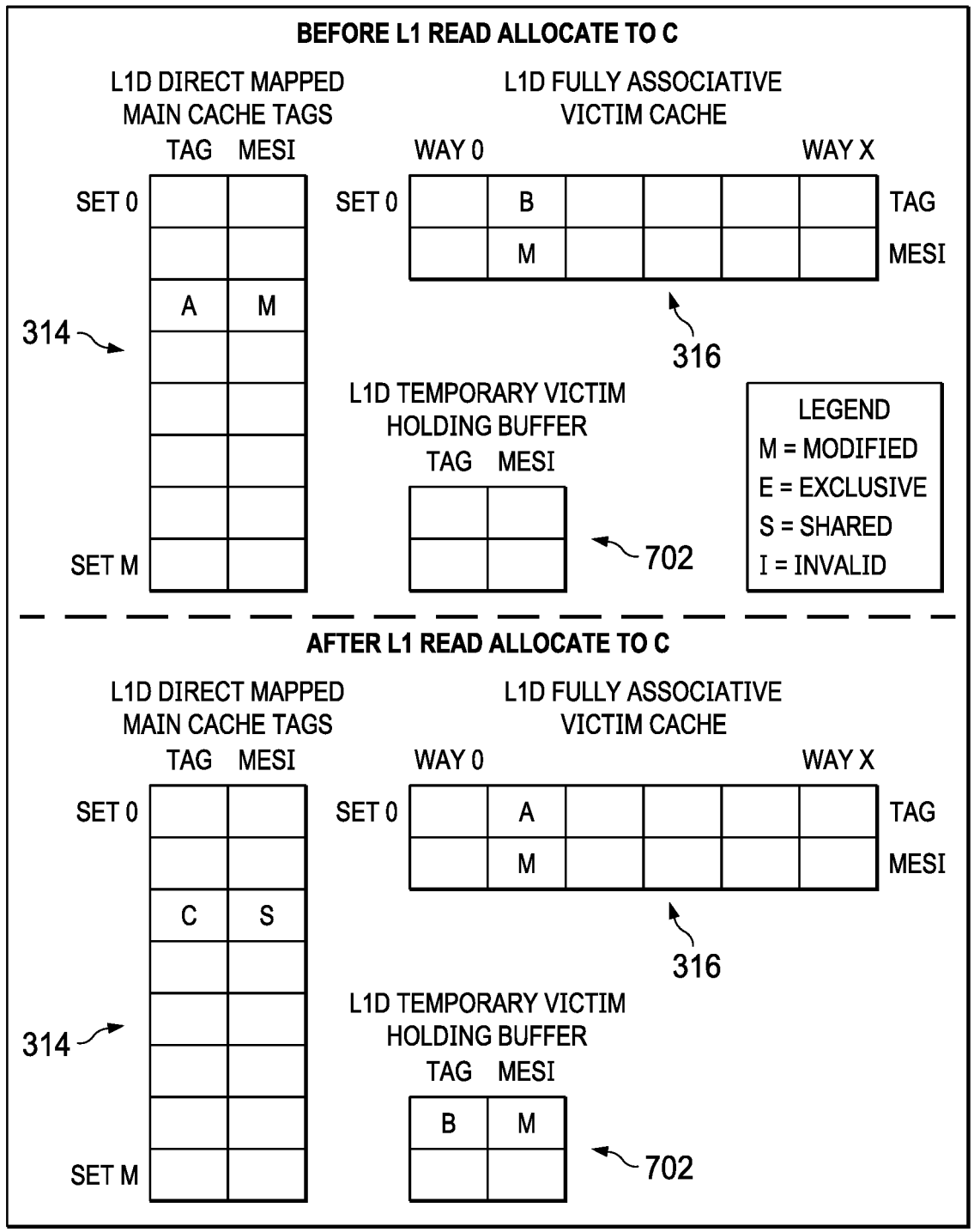
FIG. 7 shows an example of a read allocate in the L1 main and victim caches in accordance with various examples.

In an example, the L2 controller 320 learns that the L1 controller 310 is kicking a line out of its L1 victim cache 316 (e.g., to make room for a line coming from the L1 main cache 314) before the L2 controller 320 receives the displaced victim from the L1 victim cache 316. The line kicked out of the L1 victim cache 316 is held in a victim buffer 702 (e.g., as shown in FIG. 7) prior to being sent to the L2 controller 320 across the interface between the two controllers 310, 320. During this time period, the L2 controller 320 is aware of the transfer of a line from the L1 main cache 314 to the L1 victim cache 316, which the L2 controller will cause to be mirrored in the shadow L1 main and shadow L1 victim caches 326, 328. However, the L2 controller 320 has not yet received the displaced victim from the L1 victim cache 316, as the displaced victim is still in the victim buffer 702.

The floating entries in the shadow L1 victim cache 328 address this issue. These floating entries extend the size of the shadow L1 victim cache 328 to include at least the number of victim buffers in the L1 cache subsystem 304. In one example, the floating entries result in the shadow L1 victim cache 328 having twice the number of entries as the L1 victim cache 316. In an example, the exact location of entries in the L1 victim cache 316 does not need to match the location of the same cache line as it is shadowed in the shadow L1 victim cache 328. Decoupling the locations between the L1 victim cache 316 and the shadow L1 victim cache 328 improves the safety of the protocol, as a full address comparison is performed when the L2 controller 320 looks for an entry in the L1 victim cache 316. Subsequently, when the L2 controller 320 receives the displaced victim across the interface from the victim buffer, the L2 controller 320 causes the line to be removed from its shadow L1 victim cache 328.

Figure 8:
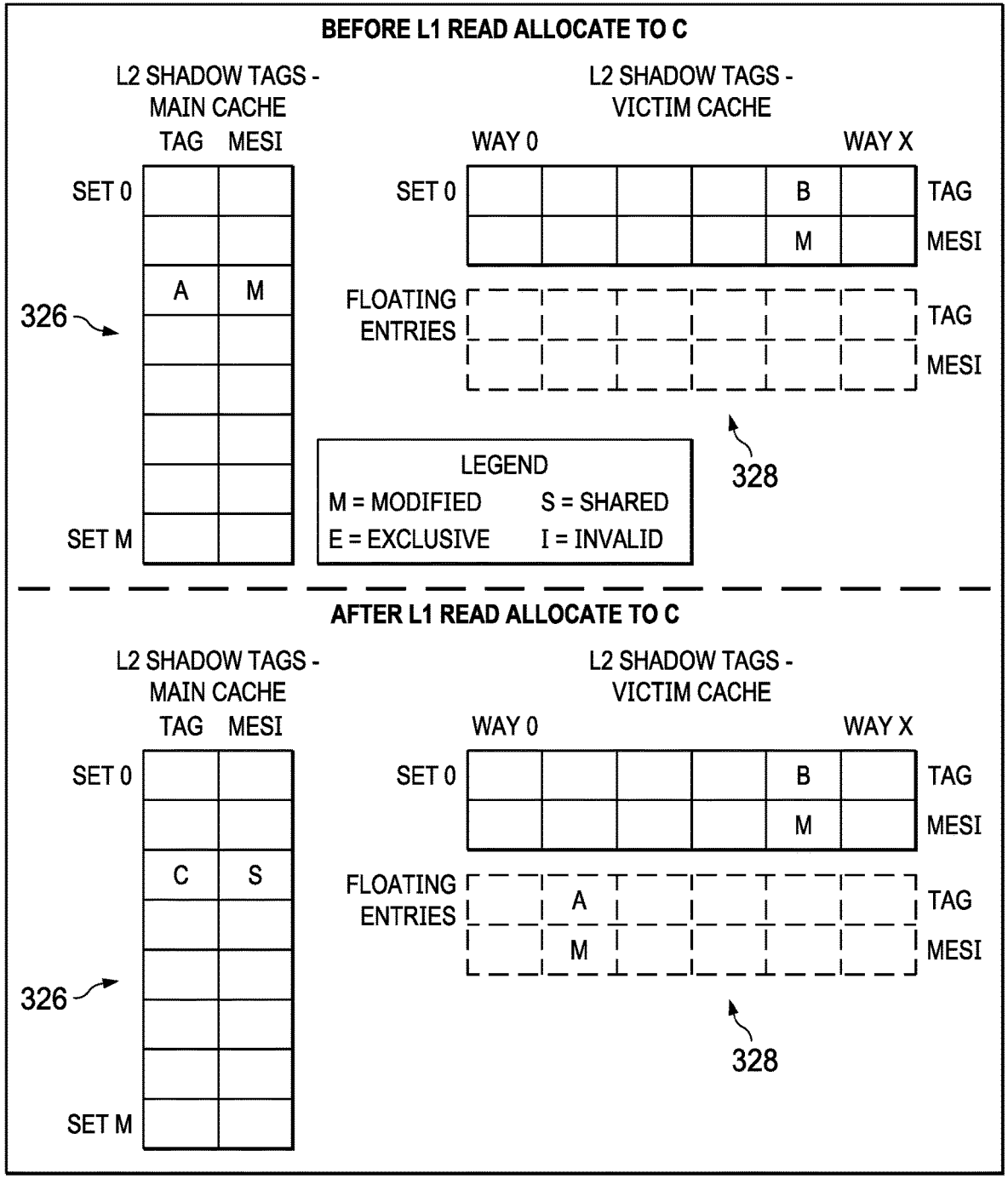
FIG. 8 shows an example of a read allocate in the L2 shadow L1 main and shadow L1 victim caches in accordance with various examples.

FIG. 7 shows an example of an L1 cache subsystem 304 allocation of a new line at address C (e.g., line C), both before and after the allocation takes place. FIG. 8 shows the corresponding example from the view of the L2 cache subsystem 306. Referring first to FIGS. 7 and 8 at once, before the allocation takes place, the L1 main cache 314 contains a cache line A that is in the modified (M) state, and the L1 victim cache 316 contains a cache line B that is also in the modified state. At the same time, the shadow L1 main cache 326 also contains the cache line A (e.g., tag and MESI data for the cache line A), which is in the same relative physical location within the shadow L1 main cache 326 as the cache line A in the L1 main cache 314. Similarly, the shadow L1 victim cache 328 also contains the cache line B (e.g., tag and MESI data for the cache line B), which is not necessarily in the same relative physical location within the shadow L1 victim cache 328 as the cache line B in the L1 victim cache 316.

When the L1 controller 310 decides to allocate line C, the L1 controller 310 conveys this allocation to the L2 controller (e.g., as part of a read request issued by the L1 controller 310). In this example, the address of line C maps to the same location in the L1 main cache 314 as the line A, and thus the L1 controller 310 relocates line A to the L1 victim cache 316, in a location occupied by the line B. As a result of the line B being modified, the L1 controller 310 determines to send line B to the L2 cache subsystem 306 as a victim and moves the line B to the victim buffer 702. After the read allocate for the line C, the L1 main cache 314 contains the line C in the location that formerly held the line A, the L1 victim cache 316 contains the cache line A that was relocated from the L1 main cache 314, and the victim buffer 702 contains the cache line B that was evicted from the L1 victim cache 316.

Similarly, after the read allocate for the line C (e.g., communicated by the L1 controller 310 to the L2 controller 320 as part of the read request for the line C), the shadow L1 main cache 326 contains the line C in the location that formerly held the line A and the shadow L1 victim cache 328 contains the relocated line A in one of its floating entries, while the line B also remains in the shadow L1 victim cache 328. As explained above, there is a period of time in which the L2 controller 320 is aware that the L1 controller is moving the line A from the L1 main cache 314 to the L1 victim cache 316, but the L2 controller 320 has not yet received the line B as a victim (e.g., the line B is still in the victim buffer 702). The floating entries of the shadow L1 victim cache 328 provide an additional storage buffer, and the L2 controller 320 is configured to remove the line B from the shadow L1 victim cache 328 when the line B is received as a victim on the interface between the L2 cache subsystem 306 and the L1 cache subsystem 304.

In general and as explained above, the L2 controller 320 is configured to receive an indication from the L1 controller 310 that a cache line is being relocated from the L1 main cache 314 to the L1 victim cache 316 (e.g., the cache line A in the example of FIGS. 7 and 8). In response to receiving the indication, the L2 controller 320 updates the shadow L1 main cache 326 to reflect that the cache line A is no longer located in the L1 main cache 314. Similarly, in response to receiving the indication, the L2 controller 320 updates the shadow L1 victim cache 328 to reflect that the cache line A is located in the L1 victim cache 316. The signaling protocol by which the L1 controller 310 communicates movement of cache lines between its L1 main cache 314, L1 victim cache 316, and victim buffer 702 are explained in further detail below. However, in one example the indication from the L1 controller 310 is a response to a snoop request from the L2 cache subsystem 306 to the L1 cache subsystem 304. In another example, the indication from the L1 controller 310 is a read request from the L1 cache subsystem 304 to the L2 cache subsystem 306.

These examples, in particular the floating entries of the shadow L1 victim cache 328, enable cleaner handoff of a victim line from the L1 cache subsystem 304 to the L2 cache subsystem 306 by removing the timing window where a line is removed from the L1 victim cache 316, but has not yet been received by the L2 cache subsystem 306 as a victim Additionally, the L2 controller 320 maintaining accurate shadows of the L1 main cache 314 and the L1 victim cache 316 allows the L2 controller to only generate snoop transactions when necessary (e.g., when the L2 controller 320 is aware that a line is held in one of the L1 caches 314, 316).

As explained above, the L1 controller 310 communicates movement of cache lines between its L1 main cache 314, L1 victim cache 316, and victim buffer 702 to the L2 controller 320. In some examples, this communication occurs in conjunction with a response to a snoop request from the L2 cache subsystem 306 to the L1 cache subsystem 304. In other examples, this communication occurs in conjunction with a read request from the L1 cache subsystem 304 to the L2 cache subsystem 306.

Referring back to FIG. 3, in some examples a transaction bus or interface between the L1 cache subsystem 304 and the L2 cache subsystem 306 contains a greater bandwidth than is needed to pass a transaction between the subsystems 304, 306. The transaction bus is represented schematically by the coupling between the L1 cache subsystem 304 and the L2 cache subsystem 306 (or similar couplings between L1 and L2 structures in FIGS. 1 and 2). The transaction bus has a bandwidth of m+n bits, while a transaction (e.g., a read, a write, a snoop, a victim) only requires m bits, leaving n bits of the transaction bus unused. Examples of this disclosure leverage this excess bandwidth on the transaction bus between the L1 cache subsystem 304 and the L2 cache subsystem 306 to communicate information from the L1 controller 310 to the L2 controller 320 in order to allow the L2 controller 320 to maintain its shadow L1 main cache 326 (e.g., tag and MESI information corresponding to the L1 main cache 314) and shadow L1 victim cache 328 (e.g., tag and MESI information corresponding to the L1 victim cache 316).

In particular, the L1 controller 310 is configured, in some examples, to send sideband signals in conjunction with a functional read transaction to the L2 controller 320. The sideband signals contain information related to cache line movement (e.g., as described above with respect to the example of FIGS. 7 and 8) occurring in the L1 cache subsystem 304. Thus, the cache line movement information is communicated in parallel (e.g., as a part of a single transaction) with the functional read transaction that causes the cache line movement(s). The L2 controller 320 not only responds to transactions and information from the L1 controller 310, but the L2 controller 320 also creates and enforces snoop transactions as required to maintain I/O (e.g., direct memory access (DMA)) coherence from non-caching requestors within the system (e.g., other CPU cores 102 in the system 100 may initiate a DMA request that is passed to the L2 controller 320 from a L3 controller, shared across CPU cores 102 as shown in FIG. 1). In examples, these snoop transactions also cause the L2 controller 320 to initiate changes to its shadow L1 main cache 326 and shadow L1 victim cache 328, as well as the L1 main cache 314 and the L1 victim cache 316. For example, if the L1 controller 310 invalidates a line as a result of a snoop transaction (e.g., because the snoop transaction required invalidation, or because of a requirement due to the current state of the L1 main cache 314 or L1 victim cache 316), the snoop response will indicate that the line transitioned to the invalid state. The L2 controller 320 then uses this information to update its shadow L1 main cache 326 or shadow L1 victim cache 328. Thus, in addition to functional read transactions, the L1 controller 310 is configured to send additional sideband signals in conjunction with a response to a snoop transaction.

Examples of this disclosure reduce bandwidth on the transaction bus by avoiding the need for multiple messages to communicate both the functional read transaction and movements of cache lines within the L1 cache subsystem 304 that will result from that read transaction. Further, examples of this disclosure reduce timing dependencies and implementation complexity by avoiding the use of a separate asynchronous interface to communicate cache line movement information.

FIG. 9 shows a table 900 of sideband signaling protocol data in accordance with an example of this disclosure. The scope of this disclosure is not limited to any particular arrangement of signals within a transaction bus. For a given read transaction, the L1 controller 310 indicates to the L2 controller 320 whether the read transaction will allocate (the alloc signal) into the L1 main cache 314, and if so, which line is moving from the L1 main cache 314 to the L1 victim cache 316, and which line is moving out of the L1 victim cache 316. If the alloc signal is de-asserted, then the L2 controller 320 disregards the remaining sideband signals.

In the table 900, the main_valid and victim_valid signals indicate whether the other main* and victim* signals, respectively, are valid. For example, the L1 controller 310 is configured to de-assert the valid signals when transmitted in parallel with a transaction that does not result in cache line movement(s) in the L1 main cache 314 and the L1 victim cache, respectively. The main_mesi and victim_mesi signals indicate the cache coherence state (e.g., MESI state) for a cache line moving from the L1 main cache 314 to the L1 victim cache 316 and for a cache line moving out of the L1 victim cache 316, respectively. The main_secure and victim_secure signals indicate whether the cache line moving from the L1 main cache 314 to the L1 victim cache 316 and the cache line moving out of the L1 victim cache 316, respectively, is secure. The main_address and victim_address signals indicate the addresses for the cache line moving from the L1 main cache 314 to the L1 victim cache 316 and for the cache line moving out of the L1 victim cache 316, respectively.

The L2 controller 320 is thus configured, in this example, to receive, in a single transaction, a read request in parallel with the aforementioned sideband signals that detail the cache line movement(s) that will occur in the L1 cache subsystem 304 as a result of the read request. In order for the L1 controller 310 to allocate space for data returned in response to the read request, the sideband signals indicate an address and coherence state of the cache line moving from the L1 main cache 314 to the L1 victim cache 316 and for the cache line moving out of the L1 victim cache 316.

The L2 controller 320 is configured to update the shadow L1 main cache 326 to reflect that the cache line moving from the L1 main cache 314 to the L1 victim cache 316 is no longer present in the L1 main cache 314. Similarly, the L2 controller 320 is configured to update the shadow L1 victim cache 328 to reflect that the cache line moving from the L1 main cache 314 to the L1 victim cache 316 is now present in the L1 victim cache 316. If one or more of the valid bits in the sideband signals 900 are de-asserted, the L2 controller 320 is configured not to update its shadow L1 main cache 326 (main_valid de-asserted) or its shadow L1 victim cache 328 (victim_valid de-asserted).

In some examples, the L2 controller 320 is also configured to update the shadow L1 victim cache 328 to reflect that a cache line is no longer located in the L1 victim cache 316. In particular, if the victim_mesi signal indicates that the cache line moving out of the L1 victim cache 316 has a coherence state other than modified (e.g., exclusive or shared), then the L2 controller 320 does not expect to receive a corresponding victim transaction because it is not necessary to write back a cache line that is not dirty. On the other hand, if the victim_mesi signal indicates that the cache line moving out of the L1 victim cache 316 has a modified coherence state, then the L2 controller 320 waits to receive a victim transaction (e.g., from the victim buffer 702). Upon receiving the victim transaction, the L2 controller 320 is configured to update the shadow L1 victim cache 328 to reflect that a cache line is no longer located in the L1 victim cache 316.

The foregoing examples reduce bandwidth on the transaction bus between the L1 cache subsystem 304 and the L2 cache subsystem 306 by avoiding the need for multiple messages to communicate both the functional read transaction and the movements of cache lines within the L1 cache subsystem 304 that will result from that read transaction.

The sideband signaling protocol discussed above leverages unused bandwidth on a transaction bus to facilitate communication of both the functional read transaction and the movements of cache lines within the L1 cache subsystem 304 that will result from that read transaction. However, in certain cases, the L1 controller 310 makes changes to the L1 main cache 314 and/or L1 victim cache 316 that are not coupled to a transaction that would be communicated to the L2 controller 320. In these cases, the L2 controller 320 needs to be made aware of the changes to L1 main cache 314 and/or L1 victim cache 316 in another way.

In particular, for accurate coherent behavior, the L2 controller 320 maintains an accurate directory of the lines held in the L1 main cache 314 and L1 victim cache 316 (e.g., as shadow copies). This enables the L2 controller 320 to send snoop transactions to the L1 controller 320 to get the most up to date copy of the data when the L2 controller 320 knows the line is cached in the L1 cache subsystem 304.

When the L1 controller 310 determines it must evict a non-modified line from the L1 victim cache 316 (e.g., for various reasons dependent on workload), the L1 controller 310 is configured in an example to inform the L2 controller 320 that the line is no longer held in the L1 cache subsystem 304. In an example, the L1 controller 310 does not inform the L2 controller 320 that the line is no longer held in the L1 cache subsystem 304. If the L1 controller 310 did not notify the L2 controller 320 that the line is no longer present, the L2 controller 320 may send at least one more snoop transaction to the address at a later time, believing that the line is still held in the L1 cache subsystem 304. When the line is not found, the L1 controller will return a snoop response indicating that the line was not present. This concept is described as a snoop miss, and results in unnecessary delays when the line was evicted knowingly by the L1 controller.

Examples of this disclosure address the foregoing by utilizing a tag update bus to employ a single cycle, pulsed protocol that enables the L1 controller 310 to communicate with the L2 controller 320 outside of the transaction-based sideband signaling protocol explained above. The tag update bus is separate from the transaction bus described above. Similarly to the transaction bus, the tag update bus is represented schematically by the coupling between the L1 cache subsystem 304 and the L2 cache subsystem 306 (or similar couplings between L1 and L2 structures in FIGS. 1 and 2). Further, unlike transactions received over the transaction bus, which are held in a buffer and arbitrated before being utilized by the L2 controller 320, the information provided over the tag update bus is usable by the L2 controller 320 upon receipt. The tag update bus protocol allows the L2 controller 320 to accurately maintain the shadow L1 main cache 326 and the shadow L1 victim cache 328. In some cases, the tag update bus protocol is in the form of parallel signal groups, allowing the L1 controller 310 to communicate two or more cache updates to the L2 controller 320 per cycle.

By communicating the invalidations to the L2 controller 320, unnecessary snoop transactions can be avoided, resulting in shorter latencies for processing transactions in the L2 cache subsystem 306. Additionally, power savings may be realized by reducing the number of RAM accesses required by multiple arbitrations for the command that resulted in a snoop miss.

FIG. 10 shows a table 1000 of tag update bus protocol data in accordance with an example of this disclosure. The scope of this disclosure is not limited to any particular arrangement of signals within the tag update bus. In the table 1000, the t0_req and t1_req signals indicate whether the other t0 and t1 signals, respectively, are valid for use. When the L2 controller 320 detects that the t0_req or t1_req signals are asserted, the L2 controller 320 processes the remaining tag update bus signals. The t0_address and t1_address signals indicate the addresses for the cache line having its coherence state updated. The t0_mesi and t1_mesi signals indicate the cache coherence state (e.g., MESI state) for the cache line identified by t0_address and t1_address, respectively. The main_secure and victim_secure signals indicate whether the cache line identified by t0_address and t1_address, respectively, is secure.

In certain examples, t0_address and t1_address comprises an address in either the L1 main cache 314 or the L1 victim cache 316, while in other examples the tag update bus is used solely to communicate updates to coherence state information for cache lines in the L1 victim cache 316. In some examples, t0_mesi and t1_mesi could indicate any final cache coherence state for the cache line identified by t0_address and t1_address. The tag update bus provides the L1 controller 310 a means to communicate the cache line invalidations that result from the L1 controller 310, while avoiding the snoop miss scenario described above.

The L2 controller 320 is thus configured to receive, over the tag update bus separate from a transaction bus, a message from the L1 controller 310 that includes a valid signal (e.g., t0_req), an address (e.g., t0_address), and a cache coherence state (e.g., t0_mesi). The message thus details an update to cache line coherence state(s) that will occur in the L1 cache subsystem 304.

The L2 controller, in response to the valid signal being asserted, is configured to identify an entry in the shadow L1 main cache 326 or the shadow L1 victim cache 328 having an address corresponding to the address of the message and update a coherence state of the identified entry to be the coherence state of the message. In one example, the L2 controller 320 is configured only to identify an entry in the shadow L1 victim cache 328 having the address of the message. Concurrently, the L2 controller 320 may receive transactions over the transaction bus from the L1 controller 310. These transactions are separate from the message received over the tag update bus.

In some examples, the L2 cache subsystem 306 includes a transaction first-in, first-out buffer (FIFO, not shown for simplicity) coupled to the transaction bus that stores transactions received from the L1 cache subsystem 304 pending processing of those transactions by the L2 controller 320. Messages received by the L2 controller 320 over the tag update bus are not stored in the transaction FIFO, and are instead processed by the L2 controller 320 upon receipt of an asserted valid signal (e.g., t0_req).

Figure 11:
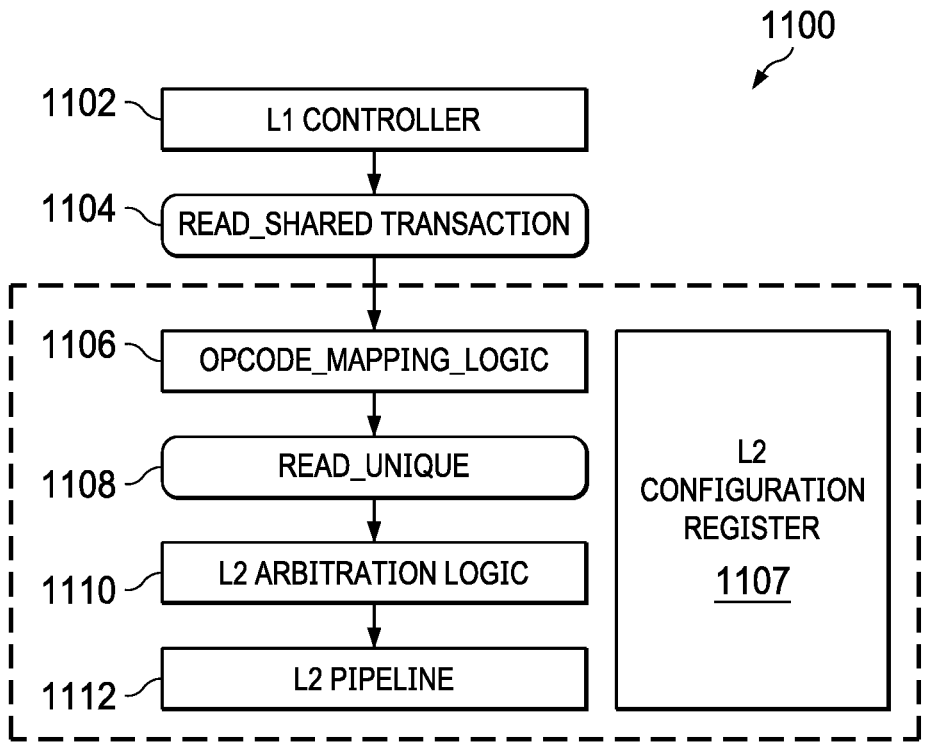
FIG. 11 shows a block diagram illustrating shared state suppression in accordance with various examples.

In accordance with some examples of this disclosure, the L2 controller 320 exists in a system-wide MESI cache coherence implementation as described above. However, the L2 controller 320 is configured to remap certain transactions from certain masters to implement a local MEI protocol between the L2 controller 320 and the L1 controller 310 or the L3 controller 309. In certain circumstances, remapping from MESI to MEI by the L2 controller 320 enables higher performance on read/write software workloads where memory locations are frequently read before being written to. For example, in a multi-core coherence solution, multiple caches can hold a cache line in the shared state. When one cache needs to modify the line, it must first initiate messaging to a downstream (e.g., numerically higher) controller which results in each of the other caches receiving an invalidating snoop to remove their copy. Finally, once snoop responses have been received, the initiating cache updates the cache coherence state of the line from shared to exclusive. The initiating cache then performs its cache line write and transitions the cache line to the modified state. Thus, when a line is actively shared between multiple different caches, and modified frequently, the number of coherence messages (read, write, victim, snoop) that are required can become large, negatively impacting the performance of software executing on the CPU core 302. Suppression of the shared state by the L2 controller 320 causes each cache line allocation to bring the line in the exclusive state, reducing the need for future coherent messaging when a modification of the cache line occurs FIG. 11 shows a block diagram of an exemplary flow 1100 of a transaction from the L1 controller, shown here as block 1102, to the L2 instruction pipeline 1112, prior to being processed by the L2 controller 320. In the example of FIG. 11, it is assumed that the transaction originates from the L1 controller 1102; however, as will be explained further below, multiple masters could also issue the transaction. Regardless of the issuing master, the transaction is represented by block 1104 as a transaction that would invoke or generate a cache line in the shared coherence state.

In accordance with examples of this disclosure, the L2 controller 320 suppresses the shared state by applying opcode mapping logic 1106 to the transaction 1104. As will be explained further below, the opcode mapping logic 1106 maps a transaction opcode to a subset of opcodes for the final coherent cache state of the cache line comprising the modified, exclusive, or invalid states. In particular, opcodes that would have resulted in a final cache line coherence state of shared are remapped to one of this subset of opcodes. The opcode mapping logic 1106 need not map opcodes that would have resulted in a final cache state of modified, exclusive, or invalid.

The first request, or transaction 1104, is thus mapped to a second request demonstrated by block 1108, which avoids invoking the shared coherence state. The second request is then arbitrated as normal by L2 arbitration logic 1110 and enters the L2 instruction pipeline 1112, to be subsequently processed by the L2 controller 320.

In some examples, the L2 cache subsystem 306 includes a configuration register shown as block 1107, which includes a shared field. The shared field allows the L2 cache subsystem 306 to be programmatically configured to either suppress the shared state, or not to suppress the shared state (e.g., not perform opcode mapping and function as a part of the larger MESI-based coherence system, described above). For example, if the shared field in configuration register 1107 is asserted, then the opcode mapping logic 1106 is not employed to map transaction opcodes to that would have resulted in a final cache line coherence state of shared. Thus, if a transaction 1104 is received as a third request when the shared field is asserted, the third request is processed by the L2 controller 320 without having its opcode mapped by the opcode mapping logic 1106.

Figure 12:
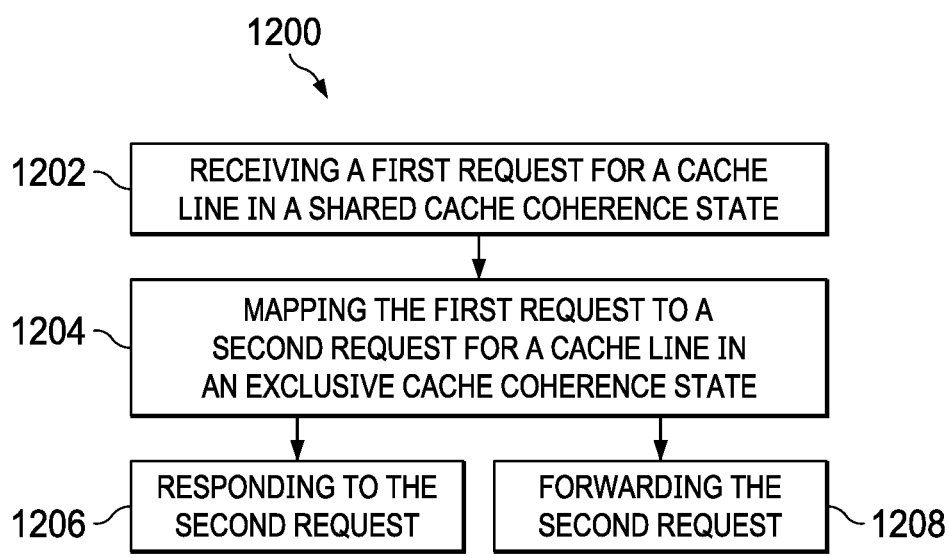
FIG. 12 shows a flow chart of a method for shared state suppression in accordance with various examples.

FIG. 12 shows a flow chart of a method 1200 in accordance with various embodiments. The method 1200 begins in block 1202 with the L2 controller 320 receiving a first request for a cache line in a shared cache coherence state. The request may be received from the L1 controller 310 as a read request, from the streaming engine 210 as a CMO that requires the L2 controller 320 to issue a snoop to the L1 controller 310, or from the L3 controller 309 as a snoop that requires the L2 controller 320 to issue a snoop to the L1 controller 310.

The method 1200 continues in block 1204 with the L2 controller 320 mapping the first request to a second request for a cache line in an exclusive cache coherence state, as explained above. For example, opcode mapping logic 1106 is applied to the opcode of the first request (e.g., invoking the shared coherence state) to map to the opcode of the second request (e.g., invoking the exclusive coherence state). As explained, the opcode mapping logic 1106 is carried out prior to the request entering the L2 arbitration logic 1110 and the L2 instruction pipeline 1112, and thus being processed by the L2 controller 320. In an example, read requests are either allocating or non-allocating, and either non-coherent or coherent. In this example, the opcode mapping logic 1106 maps non-coherent allocating reads to a read command without snoop, because no snooping is required for a non-coherent read and reading without snooping does not invoke the shared state. Similarly, the opcode mapping logic 1106 also maps non-coherent non-allocating reads to a read command without snoop. The opcode mapping logic 1106 maps coherent allocating reads to a read exclusive command, which guarantees that the line will be allocated in the exclusive state. The opcode mapping logic 1106 maps coherent non-allocating reads to a read once command, since these only need to sample the coherent data (e.g., not allocate), and thus the current owner can keep the line without invoking the shared state. In another example, certain snoop commands (e.g., from the L3 controller 309) or CMOs have an opcode that would normally require a line to transition to the shared state. In this example, the opcode mapping logic 1106 maps such snoop commands and CMOs to a snoop command or CMO, respectively, that requires the line to instead transition to the invalid state. Additionally, if the L2 controller 320 determines to send a snoop command to the L1 controller 310, the opcode mapping logic 1106 maps such a snoop command to a snoop command that requires the L1 controller 310 to instead transition the line to the invalid state.

The method 1200 then continues in block 1206 with the L2 controller 320 responding to the second request, if the second request is of a type that warrants a response (e.g., if the second request is a read response, a read response is warranted). In the event that the requested cache line is stored in the L2 cache subsystem 306, as part of its response, the L2 controller 320 transitions a coherence state of the cache line to invalid rather than shared. Alternately, the method 1200 continues in block 1208 with forwarding the second request. For example, where the first request results in a snoop being issued by the L2 controller 320, the L2 controller forwards the second request for the cache line in the exclusive state, rather than the shared state.

In some examples, the L1 controller 310 determines to change a size of the L1 main cache 314. For example, the L1 main cache 314 may be an allocated region of the larger L1 SRAM 312 that can grow (e.g., from 32 KB to 64 KB) or shrink (e.g., from 32 KB to 16 KB) in size over time, depending on requirements communicated to the L1 controller 310, for example from the CPU core 302 or software executing thereon. The L2 controller 320 needs to be aware of changes in size to the L1 main cache 314, so that the L2 controller 320 can properly maintain (e.g., change the size of) its shadow L1 main cache 326.

The following protocol enables the L2 controller 320, in an example, to change the size of its shadow L1 main cache 326 while avoiding data corruption and/or transaction deadlocks (e.g., where a first transaction relies on a second transaction, which is pending resolution of the first transaction). In one example, sideband signals of the transaction bus (explained above) are used by the L1 controller 310 to communicate the size change of the L1 main cache 314 to the L2 controller 320. In this example, reference is made to certain ones of the sideband signals of the transaction bus, in particular referred to as: global_on, global_coh_type, and cache_size. The global_on signal indicates that the L1 controller 310 is performing a global operation on its L1 main cache 314. The global_coh_type signal indicates the type of global coherence operation being performed on the L1 main cache 314. In the specific example of a size change of the L1 main cache 314, the global_coh_type will be a writeback invalidate operation. During a cache size change, coherence is maintained by writing the data to the endpoint and by invalidating the cacheline. The cache_size signal indicates the size to which the L1 main cache 314 is transitioning.

Figure 13:
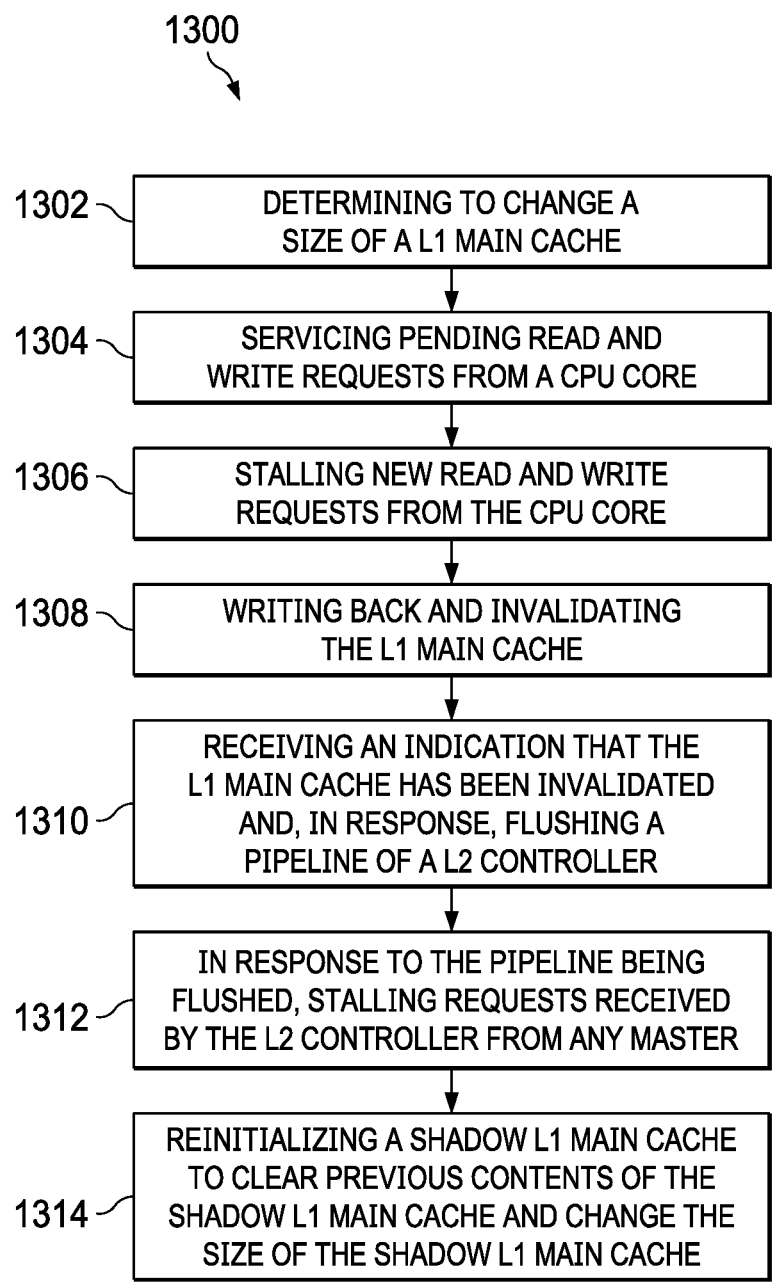
FIG. 13 shows a flow chart of a method for changing a cache size in accordance with various examples.

FIG. 13 shows a flow chart of a method 1300 for changing the size of the L1 main cache 314, and the resultant change in size of the shadow L1 main cache 326. The method 1300 begins in block 1302 with determining, by the L1 controller 310, to change a size of the L1 main cache 314. This determination to change the cache size is, for example, the result of a control or configuration register write programming a configuration register of the L1 controller 310 to indicate the desired new cache size and initiate the cache size change.

The method 1300 continues in block 1304 with the L1 controller 310 servicing pending read and write requests from a CPU core, such as the CPU core 302. The method 1300 then continues in block 1306 in which the L1 controller 310 stalls new read and write requests from the CPU core 302. This allows the L1 controller 310 to work through pending requests but restrict new requests so that it may perform the global operation (e.g., writeback invalidate and cache size change) on the L1 main cache 314.

The method 1300 continues in block 1308 with the L1 controller 310 writing back and invalidating the L1 main cache 314. At this point in the method 1300, the L1 controller 310 asserts the global_on signal to indicate it is performing a global operation, and the global_coh_type indicates a writeback invalidate as explained above. The L1 controller 310 is configured to send victims to the L2 controller 320 during this stage, which enables the L2 controller 320 to update the shadow L1 main and victim caches 326, 328. If the victim hits in the L2 cache 324, the L2 controller 320 is also configured to update that cache line with the victim data. If the victim is not present in L2 cache 324, the L2 controller 320 forwards the victim (e.g., to the L3 controller 309). During the size change of the L1 main cache 314, coherence is maintained writing the data back to the endpoint and invalidating the cache line. While the L1 controller 310 writes back and invalidates the L1 main cache 314, the L1 controller 310 is also configured to accept and stall a snoop request from the L2 controller 320.

While the L1 controller 310 asserts the global_on signal (e.g., during a global operation), the L1 controller 310 also de-asserts a ready signal, which indicates to the CPU core 302 not to send the L1 controller 310 additional requests for a cache size change or other global coherence operations. The ready signal remains de-asserted until the global operation is completed (e.g., the global_on signal is de-asserted).

Once the global_on signal is de-asserted, the L1 controller 310 responds to any pending snoop transactions that were received from the L2 controller 320 and stalled by the L1 controller 310 during the writeback invalidate (e.g., the global coherence operation for L1 main cache 314 size change). In an example, the L1 controller 310 responds to the pending snoop transactions with a response indicating a cache miss because the L1 main cache 314 is invalidated as part of the size change protocol. Once the global_on signal is de-asserted, the L1 controller 310 also begins accepting read and write requests from the CPU core 302 using the new cache size for the L1 main cache 314. At this point the L1 controller 310 has implemented the functionality to change the size of its L1 main cache 314.

The method 1300 then continues to block 1310 in which the L2 controller 320 receives an indication that the L1 main cache 314 has been invalidated and had its size changed. In an example, the L1 controller 310 sends such an indication to the L2 controller in response to the L1 controller 310 having received write responses for all victims written back by the L1 controller 310, while no further victims are pending to be written back by the L1 controller 310.

In this example, the L1 controller 310 uses sideband signals of global_on, global_coh_type, and cache_size to communicate that the L1 main cache 314 has been invalidated and had its size changed. For example, when global_coh_type indicates a writeback invalidate and the cache_size signal has changed, the L1 controller 310 de-asserting global_on indicates to the L2 controller 320 that the L1 main cache 314 has been invalidated and had its size changed. This indication allows the L2 controller 320 to begin the process of resizing its shadow L1 main cache 326. To begin resizing the shadow L1 main cache 326, the L2 controller 320 flushes its pipeline, or completes all transactions that are present in its pipeline while stalling transactions from other masters.

In some examples, the L2 controller 320 flushes its pipeline in separate phases, which include a blocking soft stall phase, a non-blocking soft stall phase, and a hard stall phase. In general, blocking transactions include read requests and write requests that are not victims, which have the potential to create a secondary transaction (e.g., a snoop), while non-blocking transactions include victims, snoops, and all responses.

In an example, during the blocking soft stall phase, the L2 controller 320 stalls all blocking transactions, such as fetches, read requests, and write requests from the CPU core 302 and DMA read/write accesses (e.g., from another CPU core) but allows response transactions, non-blocking snoop and victim transactions to be accepted and arbitrated. In some examples the L2 controller 320 flushes its pipeline over several cycles. Following the blocking soft stall phase, the L2 controller 320 enters the non-blocking soft stall phase, in which the L2 controller 320 allows response transactions and victims but stalls snoop transactions, in addition to the blocking transactions already stalled in the blocking soft stall phase. As a result, the L2 controller 320 does not initiate new snoops to the L1 main cache 314 for lines previously cached in in the L1 main cache 314.

After the L2 controller 320 pipeline is flushed, the method 1300 continues to block 1312 in which the L2 controller 320 stalls requests received from any master. This phase is the hard stall phase referred to above. In particular, the L2 controller 320 pipeline is flushed, the L2 controller 320 enforce a hard stall where all transactions, including response transactions, are stalled from all masters.

In some examples, the L2 controller 320 also de-asserts or causes the ready signal (explained above with respect to the L1 controller) to be de-asserted. By de-asserting the ready signal, the L2 controller 320 prevents the CPU core 302 from sending requests for a cache size change or other global coherence operation until the L2 controller 320 has completed the currently-pending request (e.g., a cache size change). In one example, the ready signal provided to the CPU core 302 comprises a logical AND of a ready signal from the L1 controller 310 and the L2 controller 320. That is, the CPU core 302 only receives an asserted ready signal when both the L1 controller 310 and the L2 controller 320 assert their ready signals (e.g., when the cache size change operation is complete).

When the hard stall is enforced in block 1312, the method 1300 then continues to block 1314 in which the L2 controller 320 reinitializes the shadow L1 main cache 326 to clear its previous contents (e.g., invalidate cache lines previously held in the shadow L1 main cache 326) and change a size of the shadow L1 main cache 326. In some examples, reinitializing the shadow L1 main cache 326 takes several cycles, during which the L2 controller 320 continues to enforce the hard stall on other masters. Once the shadow L1 main cache 326 is reinitialized, the L2 controller 320 unstalls the masters and asserts its ready signal. The L2 controller 320 then begins to process pending transactions from one or more holding buffers, and accepts new transactions. At this point the size change protocol execution is complete. In some cases, the L1 controller 310 sends a transaction (e.g., a read request) to the L2 controller 320 while the L2 controller 320 is flushing its pipeline in block 1310 or stalled in block 1312, and thus the transaction from the L1 controller 310 is stalled as well. The L2 controller 320 responds to such transactions after reinitializing the shadow L1 main cache 326.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method comprising:
receiving, by a first memory controller, an instruction to resize a cache memory;
receiving, by the first memory controller, a first cache operation after the instruction;
servicing, using the cache memory, a second cache operation that was pending when the instruction was received;
stalling the first cache operation;
performing an invalidate of the cache memory;
resizing the cache memory; and
thereafter;
servicing, using the cache memory, the first cache operation; and
providing a signal to a second memory controller configured to cause the second memory controller to resize a shadow cache associated with the cache memory.

2. The method of claim 1, wherein:
the signal is a first signal; and
the method further comprises providing, by the first memory controller to a processor, a second signal configured to inhibit cache operations during the performing of the invalidate of the cache memory.

3. The method of claim 1, wherein:
the signal is a first signal;
the first memory controller is a level one (L1) cache memory controller;
the second memory controller is a level two (L2) cache memory controller; and
the method further comprises providing a second signal specifying a new size of the cache memory to the second memory controller.

4. The method of claim 3 further comprising:
clearing contents of the shadow cache by the L2 cache memory controller; and
resizing the shadow cache.

5. The method of claim 3, wherein the first signal and the second signal are provided as sideband signals.

6. The method of claim 1, wherein the invalidate of the cache memory includes a writeback of data stored in the cache memory.

7. The method of claim 1, wherein the instruction specifies a write to a configuration register of the first memory controller that specifies a new size of the cache memory.

8. A device comprising:
a level one (L1) cache controller;
a level two (L2) cache controller coupled to the L1 cache controller; and
a memory coupled to the L1 cache controller that includes a first portion allocated as an L1 cache memory, wherein the L1 cache controller is configured to:
receive a first set of cache operations;
receive an instruction to change a size of the L1 cache memory after the first set of cache operations;
receive a second set of cache operations after the instruction; and
based on the instruction:
service the first set of cache operations;

stall the second set of cache operations;
perform an invalidate of the L1 cache memory;
resize the L1 cache memory; and
after the resize of the L1 cache memory:
service the second set of cache operations; and
provide a signal to the L2 cache controller configured to cause the L2 cache controller to resize a shadow L1 cache.

9. The device of claim 8, wherein the L1 cache controller includes a configuration register and the instruction to change the size of the L1 cache memory includes a write to the configuration register that specifies a new size of the L1 cache memory.

10. The device of claim 8, wherein:
the signal is a first signal; and
the L1 cache controller is configured to, during the performing of the invalidate of the L1 cache memory and the resizing of the L1 cache memory, assert a second signal configured to inhibit cache operations.

11. The device of claim 8, wherein the invalidate of the L1 cache memory includes a writeback of data stored in the L1 cache memory.

12. The device of claim 8, wherein:
the L1 cache memory is an L1 main cache;
the signal is a first signal;
and
the L1 cache controller is configured to provide a second signal that specifies a new size of the L1 main cache to the L2 cache controller.

13. The device of claim 12 further comprising a transaction bus coupled between the L1 cache controller and the L2 cache controller, wherein the L1 cache controller is configured to provide the first signal and the second signal as sideband signals.

14. The device of claim 12 further comprising the shadow L1 cache coupled to the L2 cache controller, wherein the L2 cache controller is configured to:
clear contents of the shadow L1 cache based on the L1 main cache being invalidated; and
resize the shadow L1 cache.

15. The device of claim 12, wherein:
the L2 cache controller includes a pipeline associated with the L1 main cache; and
the L2 cache controller is configured to flush the pipeline based on the L1 main cache being invalidated.

16. The device of claim 8 wherein the L1 cache controller is configured to:
receive a snoop request; and
during the resizing of the L1 cache memory, responding to the snoop request as a cache miss.

17. The device of claim 8, wherein the L1 cache controller is configured to, based on the instruction:
assert the signal during the invalidating of the L1 cache memory and the resizing of the L1 cache memory; and
after the resizing of the L1 cache memory, de-assert the signal to cause the L2 cache controller to resize the shadow L1 cache.

18. A device comprising:
a processor;
a first cache controller coupled to the processor;
a second cache controller coupled to the first cache controller; and
a memory coupled to the first cache controller that includes a first portion configured as a cache memory, wherein the first cache controller is configured to:
receive an instruction to change a size of the cache memory from the processor;
thereafter, receive a first cache operation from the processor; and
based on the instruction:
service a second cache operation that is pending;
stall the first cache operation;
perform an invalidate of the cache memory;
resize the cache memory; and
after the resize of the cache memory:
service the first cache operation; and
provide a signal to the second cache controller configured to cause the second cache controller to resize a shadow cache associated with the cache memory.

19. The device of claim 18, wherein:
the signal is a first signal; and
the first cache controller is configured to, during the performing of the invalidate of the cache memory and the resizing of the cache memory, provide a second signal to the processor configured to inhibit cache operations.

20. The device of claim 18, wherein:
the signal is a first signal;
the first cache controller is a level one (L1) cache controller;
the cache memory is an L1 main cache;
the second cache controller is a level two (L2) cache controller; and
the L1 cache controller is configured to provide a second signal specifying a new size of the L1 main cache to the L2 cache controller.

* * * * *